United States Patent
Yamamoto et al.

(10) Patent No.: US 9,512,504 B2
(45) Date of Patent: Dec. 6, 2016

(54) METHOD FOR PRODUCING SODIUM TUNGSTATE, METHOD FOR COLLECTING TUNGSTEN, APPARATUS FOR PRODUCING SODIUM TUNGSTATE, AND METHOD FOR PRODUCING SODIUM TUNGSTATE AQUEOUS SOLUTION

(71) Applicants: A.L.M.T. Corp., Tokyo (JP); Sumitomo Electric Hardmetal Corp., Itami-shi (JP); Sumitomo Electric Industries, Ltd., Osaka-shi (JP)

(72) Inventors: Yoshiharu Yamamoto, Toyama (JP); Kazuo Sasaya, Toyama (JP); Takayuki Fudo, Toyama (JP); Akira Nakano, Toyama (JP); Syunsuke Yamanaka, Itami (JP); Takahisa Iguchi, Itami (JP); Fumiatsu Sato, Itami (JP); Akihiko Ikegaya, Itami (JP)

(73) Assignees: A.L.M.T Corp., Tokyo (JP); SUMITOMO ELECTRIC HARDMETAL CORP., Itami-shi (JP); Sumitomo ELectric Industries, Ltd., Osaka-shi (JP)

( * ) Notice: Subject to any disclaimer, the term of this patent is extended or adjusted under 35 U.S.C. 154(b) by 548 days.

(21) Appl. No.: 14/139,627

(22) Filed: Dec. 23, 2013

(65) Prior Publication Data

US 2014/0119998 A1    May 1, 2014

Related U.S. Application Data

(62) Division of application No. 13/140,767, filed as application No. PCT/JP2010/053658 on Mar. 5, 2010, now Pat. No. 8,632,747.

(30) Foreign Application Priority Data

Mar. 11, 2009  (JP) .................. 2009-058410
Mar. 11, 2009  (JP) .................. 2009-058411

(51) Int. Cl.
C22B 34/36    (2006.01)
B01J 19/28    (2006.01)
(Continued)

(52) U.S. Cl.
CPC .............. *C22B 34/36* (2013.01); *B01J 8/10* (2013.01); *B01J 19/28* (2013.01); *C01G 41/00* (2013.01);
(Continued)

(58) Field of Classification Search
CPC .................................. B01J 19/28; B01J 8/10
See application file for complete search history.

(56) References Cited

U.S. PATENT DOCUMENTS 1,535,019 A *  4/1925  Dorsey ................... C22B 34/30
                                                        423/58
1,614,149 A    1/1927  Pacz
(Continued)

FOREIGN PATENT DOCUMENTS

CN    1074421 A    7/1993
CN    1187801 A    7/1998
(Continued)

OTHER PUBLICATIONS

Tenmaya, Y., "Rare Metal High Efficiency Collection System Development Project 'Collection of Tungsten and the Like From Waste Cemented Carbide Tool'," Metal Resources Report 1, vol. 38, No. 4, pp. 407-413 (2008).
(Continued)

*Primary Examiner* — Lessanework Seifu
(74) *Attorney, Agent, or Firm* — Venable LLP; Michael A. Sartori

(57) ABSTRACT

Provided are a method for producing sodium tungstate by supplying an oxidant made of sodium nitrate or sodium nitrite to bring a tungsten containing material and the oxidant into contact with each other in an atmosphere containing oxygen to thereby continuously produce a reaction product; a method for collecting tungsten using the method; and an apparatus for producing sodium tungstate. Also provided are a method for producing a sodium tungstate aqueous solution in which a reductant is introduced into a melt containing the above-described reaction product which is then dissolved in water; and a method for collecting tungsten using the method.

1 Claim, 8 Drawing Sheets

(51) Int. Cl.
  *B01J 8/10* (2006.01)
  *C01G 41/00* (2006.01)
  *C01G 41/02* (2006.01)
  *C22B 7/00* (2006.01)
  *C01G 23/00* (2006.01)
  *C01G 35/00* (2006.01)
  *C01G 37/02* (2006.01)
  *C01G 53/00* (2006.01)
  *C01G 37/14* (2006.01)
  *C01G 51/00* (2006.01)

(52) U.S. Cl.
  CPC ............... *C01G 41/02* (2013.01); *C22B 7/001* (2013.01); *C22B 7/006* (2013.01); *B01J 2219/0004* (2013.01); *B01J 2219/00132* (2013.01); *B01J 2219/00157* (2013.01); *C01G 23/005* (2013.01); *C01G 35/00* (2013.01); *C01G 37/02* (2013.01); *C01G 37/14* (2013.01); *C01G 41/003* (2013.01); *C01G 51/42* (2013.01); *C01G 53/42* (2013.01); *C01P 2002/72* (2013.01); *Y02P 10/214* (2015.11); *Y02P 10/234* (2015.11); *Y02W 30/54* (2015.05)

(56) References Cited

U.S. PATENT DOCUMENTS

| | | |
|---|---|---|
| 4,298,581 A | 11/1981 | Douglas et al. |
| 4,557,906 A | 12/1985 | Douglas et al. |
| 4,603,043 A | 7/1986 | Douglas et al. |
| 4,629,503 A | 12/1986 | Fruchter et al. |
| 5,993,756 A | 11/1999 | Lohse |
| 6,017,499 A * | 1/2000 | Albert .................. B01J 8/10 422/209 |
| 2009/0255372 A1 | 10/2009 | Olbrich et al. |

FOREIGN PATENT DOCUMENTS

| | | |
|---|---|---|
| GB | 189873 A | 12/1922 |
| JP | S56163227 A | 12/1981 |
| JP | 58-35922 | 3/1983 |
| JP | 11-505801 T | 5/1999 |
| JP | 2008-150251 A | 7/2008 |
| JP | 2009-541596 A | 11/2009 |
| WO | WO-2008/000810 A1 | 1/2008 |

OTHER PUBLICATIONS

Kawakita et al., "Collection of Tungsten and the Like From Waste Cemented Carbide Tool," The Resources Processing Society of Japan Symposium, vol. 17, pp. 19-23 (2008).
Office Action in Chinese Patent Application No. 201080005895.8, dated May 27, 2013.
Notice of Grounds of Rejection in Japanese Patent Application No. 2011-503795, dated Oct. 8, 2013.
International Search Report in PCT International Application No. PCT/JP2010/053658, dated May 25, 2010.
Notice of Grounds of Rejection in Japanese Patent Application No. 2014-033033 dated Feb. 17, 2015.
Notice of Grounds of Rejection in Japanese Patent Application No. 2014-033035 dated Mar. 3, 2015.

* cited by examiner 1.2 HOURS 0.6 HOURS 0.3 HOURS

METHOD FOR PRODUCING SODIUM TUNGSTATE, METHOD FOR COLLECTING TUNGSTEN, APPARATUS FOR PRODUCING SODIUM TUNGSTATE, AND METHOD FOR PRODUCING SODIUM TUNGSTATE AQUEOUS SOLUTION

CROSS-REFERENCE TO RELATED APPLICATIONS

This application is a Divisional of U.S. patent application Ser. No. 13/140,767, filed Jun. 17, 2011, which is a National Stage of PCT International Application No. PCT/JP2010/053658, filed Mar. 5, 2010, which claims the benefit of Japan Patent Application No. 2009-058410, filed Mar. 11, 2009, and Japan Patent Application No. 2009-058411, filed Mar. 11, 2009, all of which are incorporated by reference in their entirety.

TECHNICAL FIELD

The present invention relates to a method for producing sodium tungstate, a method for collecting tungsten, an apparatus for producing sodium tungstate, and a method for producing a sodium tungstate aqueous solution.

BACKGROUND ART

Cemented carbide which contains tungsten carbide (WC) as a main component and added with carbide such as titanium (Ti) and tantalum (Ta) using cobalt (Co), nickel (Ni) and the like as bonding metal for the purpose of improving performance is excellent in hardness and abrasion resistance. Accordingly, such cemented carbide is suitably used for a cemented carbide tool for metal processing.

In this case, the cemented carbide tool which cannot be used any more due to chipping or abrasion and the chipped portion of the cemented carbide tool are to be discarded as hard scraps. Furthermore, part of cemented carbide powder produced in the process of manufacturing a cemented carbide tool and grinding dust and the like produced by the processing using the cemented carbide tool are to be discarded as soft scraps. These hard scraps and soft scraps contain a great amount of tungsten regarded as rare metal.

Thus, for example, a method for recycling a cemented carbide tool for recovering tungsten carbide from a used cemented carbide tool and the like is proposed in "Collection of Tungsten and the like from Waste Cemented Carbide Tool" (Metal Resources Report; Vol. 38, No. 4, pp. 407 to 413, November 2008) written by Yasuhiko Tenmaya issued by Rare Metal High Efficiency Collection System Development Project (Non-Patent Document 1). The method for recycling the cemented carbide tool disclosed in Non-Patent Document 1 is carried out as described below.

First, hard scraps and soft scraps of the cemented carbide tool are reacted with molten salt of sodium nitrate and then dissolved in water, to produce a sodium tungstate aqueous solution.

Then, an ion exchange method using ion-exchange resin is employed to produce an ammonium tungstate aqueous solution from the sodium tungstate aqueous solution. Then, ammonium paratungstate (APT) is crystallized out from the ammonium tungstate aqueous solution.

Then, the ammonium paratungstate crystallized out as described above is calcined, reduced and carbonized to thereby allow production of tungsten carbide.

Furthermore, for example, Japanese Patent National Publication No. 11-505801 (Patent Document 1) proposes to use molten salt containing 60 to 90 percent by mass of sodium hydroxide (NaOH) and 10 to 40 percent by mass of sodium sulfate ($Na_2SO_4$) for producing sodium tungstate by oxidizing the scraps of hard alloy and/or scraps of heavy metal in the molten salt. It also proposes that the reaction between the above-described scraps and molten salt occurs within a rotary kiln that is operated in a manner of batch processing and can be directly heated.

PRIOR ART DOCUMENTS

Patent Documents

Patent Document 1: Japanese Patent National Publication No. 11-505801
Non-Patent Document 1: Yasuhiko Tenmaya, Rare Metal High Efficiency Collection System Development Project, "Collection of Tungsten and the like from Waste Cemented Carbide Tool", Metal Resources Report; Vol. 38, No. 4, pp. 407 to 413, November 2008

SUMMARY OF THE INVENTION

Problems to be Solved by the Invention

However, the method disclosed in Non-Patent Document 1 poses a problem in safety of the operation since an extremely severe reaction occurs between the molten salt of sodium nitrate and the hard scraps or soft scraps of the cemented carbide tool, which causes difficulty in controlling the reaction.

Furthermore, in the method disclosed in Non-Patent Document 1, when the hard scraps and soft scraps of the cemented carbide tool are reacted with the molten salt of sodium nitrate, the metals regarded as impurities such as vanadium and chromium contained in the hard scraps and soft scraps of the cemented carbide tool may be contained in the sodium tungstate aqueous solution in the state where the metals are in the form of water-soluble metal oxide ions. This causes a problem that a sodium tungstate aqueous solution of high purity cannot be obtained.

Furthermore, in the method disclosed in Patent Document 1, although the melting point of sodium sulfate as molten salt serving as an oxidant is as high as 884° C. and the temperature during the reaction is also as high as 884° C. or more, the problem with regard to the industrial safety can still be solved which results from a high exothermic reaction which is difficult to be controlled. However, in addition to considerable corrosion of the metal material, even when the above-described reaction is developed under the high-temperature environment of 1000° C., this reaction slowly proceeds. This causes a problem that the reaction between the above-described scraps and the above-described molten salt takes much time, which leads to an increase in loss of the energy.

Furthermore, in the method disclosed in Patent Document 1, the process is performed within a rotary kiln that is operated in a manner of batch processing and can be directly heated, which requires the raw materials to be transferred into the rotary kiln and also the reaction product to be transferred out of the rotary kiln for each batch processing. In addition, there is also a problem of decreased productivity since the rotary kiln should be heated to a prescribed temperature before the above-described reaction is started.

In view of the foregoing, an object of the present invention is to provide a method for producing sodium tungstate that allows efficient production of sodium tungstate, a method for collecting tungsten using the method, and an apparatus for producing sodium tungstate.

Furthermore, an object of the present invention is also to provide a method for producing a sodium tungstate aqueous solution that allows production of a sodium tungstate aqueous solution of high purity, and a method for collecting tungsten using the method.

Means for Solving the Problems

The present invention provides a method for producing sodium tungstate from a tungsten containing material. The method includes the steps of continuously or intermittently supplying at least one of the tungsten containing material and an oxidant made of one of sodium nitrate and sodium nitrite; heating at least one of the oxidant and the tungsten containing material; and continuously producing a reaction product by bringing the tungsten containing material and the oxidant into contact with each other in an atmosphere containing oxygen.

In the method for producing sodium tungstate according to the present invention, it is preferable that a heating temperature in the step of heating is 700° C. or more and 850° C. or less.

Furthermore, in the method for producing sodium tungstate according to the present invention, it is preferable that at least a part of the reaction product is removed from a contact interface between the tungsten containing material and the oxidant.

Furthermore, in the method for producing sodium tungstate according to the present invention, it is preferable that a total amount of the oxidant to be supplied is 1.2 times or more and 4 times or less of a total mass of the tungsten containing material.

Furthermore, in the method for producing sodium tungstate according to the present invention, it is preferable that the tungsten containing material is a tungsten containing scrap from which a part of a surface is removed.

Furthermore, in the method for producing sodium tungstate according to the present invention, it is preferable that, in the step of continuously producing the reaction product, the tungsten containing material is contained in a holding container, and at least a part of the tungsten containing material contained in the holding container is immersed in a melt containing at least one of the oxidant and the reaction product.

Furthermore, in the method for producing sodium tungstate according to the present invention, it is preferable that at least half of the tungsten containing material is immersed in the melt.

Furthermore, in the method for producing sodium tungstate according to the present invention, it is preferable that an amount of the tungsten containing material immersed in the melt is kept approximately constant.

Furthermore, in the method for producing sodium tungstate according to the present invention, it is preferable that at least a part of nitrogen oxide contained in an exhaust gas generated together with the reaction product is decomposed to set a concentration of the nitrogen oxide in the exhaust gas to be continuously at 150 ppm or less.

Furthermore, it is preferable that the method for producing sodium tungstate according to the present invention includes the steps of hydrolyzing an oxoacid sodium salt produced by dissolving the reaction product in water; and filtering out a water-insoluble matter produced by hydrolysis to extract sodium tungstate.

Furthermore, the present invention provides a method for collecting tungsten including one of the above-described methods for producing sodium tungstate.

Furthermore, the present invention provides an apparatus for producing sodium tungstate. The apparatus includes a holding container for holding a tungsten containing material; a supply port for supplying sodium nitrate or sodium nitrite; an inlet port through which outside air flows into; an outlet port through which gas generated by a reaction is discharged; a reaction container capable of holding a melt containing a reaction product produced by supplying sodium nitrate or sodium nitrite onto a surface of the tungsten containing material; and a discharge port through which the melt can be discharged to outside of the reaction container. The holding container is rotatably disposed within the reaction container. The supply port is disposed above the reaction container. The discharge port is disposed below the reaction container.

Furthermore, the present invention provides a method for producing a sodium tungstate aqueous solution. The method includes the steps of introducing a reductant into a melt containing a reaction product obtained by heating at least one of a tungsten containing material and an oxidant made of one of sodium nitrate and sodium nitrite to cause a reaction between the oxidant and the tungsten containing material; and dissolving, in water, the melt into which the reductant was introduced.

In the method for producing a sodium tungstate aqueous solution according to the present invention, it is preferable that a temperature of the melt containing the reaction product into which the reductant is introduced is 700° C. or more and 850° C. or less.

Furthermore, in the method for producing a sodium tungstate aqueous solution according to the present invention, it is preferable that the reductant includes a soft scrap.

Furthermore, in the method for producing a sodium tungstate aqueous solution according to the present invention, it is preferable that a roasted soft scrap is introduced together with the reductant.

Furthermore, in the method for producing a sodium tungstate aqueous solution according to the present invention, it is preferable that the roasted soft scrap contains tungsten oxide.

Furthermore, in the method for producing a sodium tungstate aqueous solution according to the present invention, it is preferable that an amount of the reductant to be introduced is 0.05 times or more and 0.45 times or less of a mass of the melt containing the reaction product.

Furthermore, it is preferable that the method for producing a sodium tungstate aqueous solution according to the present invention includes the step of filtering out an insoluble matter produced by dissolving the melt in water.

Furthermore, in the method for producing a sodium tungstate aqueous solution according to the present invention, it is preferable that an acid is added to an aqueous solution obtained by dissolving the melt in water, to adjust a pH to fall within a range of 8.5 or more and 10 or less.

Furthermore, in the method for producing a sodium tungstate aqueous solution according to the present invention, it is preferable that a pressure is applied to inside of a container containing the melt to cause the melt to be pushed out and introduced into a container containing water.

Furthermore, in the method for producing a sodium tungstate aqueous solution according to the present invention, it is preferable that a container containing the melt is tilted to cause the melt to be introduced into a container containing water.

Furthermore, the present invention provides a method for collecting tungsten which includes one of the above-described methods for producing a sodium tungstate aqueous solution.

Effects of the Invention

According to the present invention, a method for producing sodium tungstate that allows efficient production of sodium tungstate, a method for collecting tungsten using the method, and an apparatus for producing sodium tungstate can be provided.

Furthermore, according to the present invention, a method for producing a sodium tungstate aqueous solution that allows production of a sodium tungstate aqueous solution of high purity and a method for collecting tungsten using the method can be provided.

MODES FOR CARRYING OUT THE INVENTION

Figure 1:
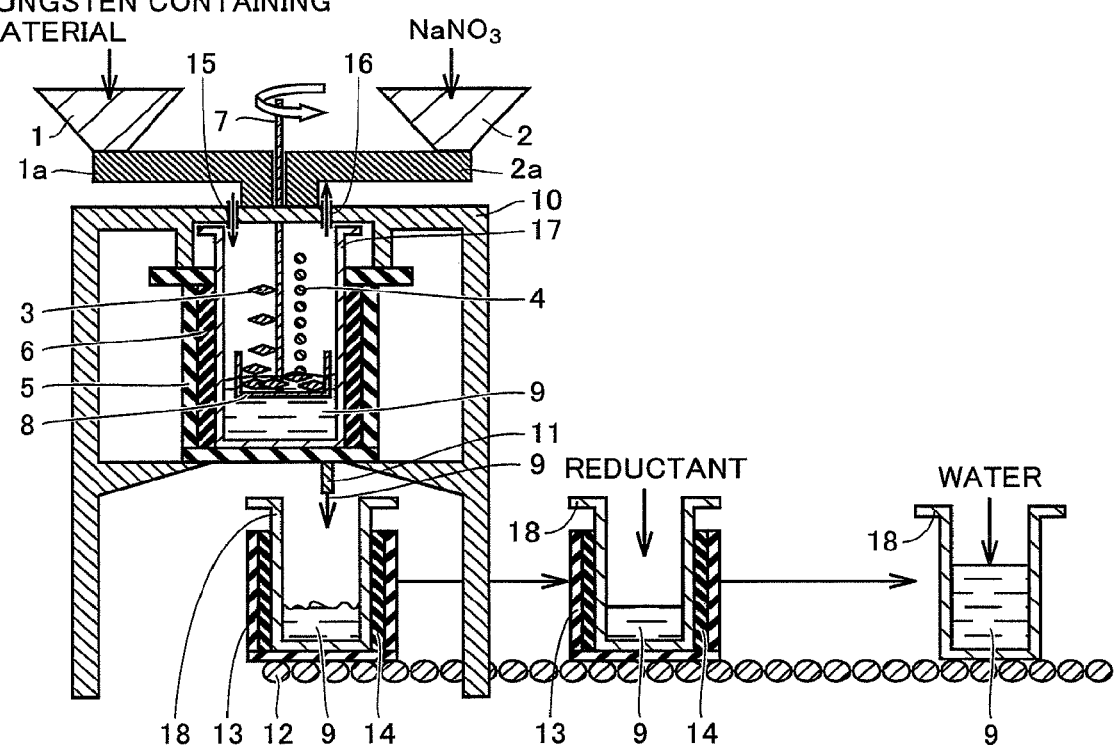
FIG. 1 is a schematic configuration diagram of an apparatus for producing sodium tungstate in accordance with the first embodiment.

The embodiments of the present invention will be hereinafter described. In the accompanying drawings of the present invention, the same or corresponding components are designated by the same reference characters.

First Embodiment

FIG. 1 is a schematic configuration diagram of an apparatus for producing sodium tungstate according to the first embodiment which is an example of the apparatus for producing sodium tungstate used in the present invention. The production apparatus shown in FIG. 1 includes a tungsten containing material supply port 1 through which a tungsten containing material is supplied; a tungsten containing material introduction pipe 1a connected to tungsten containing material supply port 1; a sodium nitrate supply port 2 through which sodium nitrate is supplied; a sodium nitrate introduction pipe 2a connected to sodium nitrate supply port 2; an outer wall portion 10 to which tungsten containing material introduction pipe 1a and sodium nitrate introduction pipe 2a are connected; a protection container 5 disposed inside outer wall portion 10; a heating device 6 disposed within protection container 5; a reaction container 17 disposed within heating device 6; a discharge port 11 extending through protection container 5 and connected to reaction container 17; a rotation shaft 7 extending through outer wall portion 10 into reaction container 17; and a holding container 8 connected to rotation shaft 7 so as to be located within reaction container 17. Furthermore, the production apparatus shown in FIG. 1 also includes a mechanism by which the gas containing oxygen can be introduced from outside of the production apparatus shown in FIG. 1 through an inlet port 15 into reaction container 17, and nitrogen oxide produced by the above-described reaction can be discharged through an outlet port 16 to the outside of the production apparatus shown in FIG. 1.

For example, the production apparatus having the configuration shown in FIG. 1 is used to allow production of sodium tungstate as described below.

First, the tungsten containing material is supplied to tungsten containing material supply port 1 to introduce a tungsten containing material 3 through tungsten containing material introduction pipe 1a into holding container 8 located within reaction container 17. Holding container 8 has a side formed, for example, in a mesh pattern to have a plurality of openings and also has a bottom provided with a communication hole. The openings of the side and the communication hole of the bottom provided in holding container 8 each are sized so as to still prevent passage of tungsten containing material 3 that is reduced in size to some extent due to dissolution.

In addition, at the time when tungsten containing material 3 is held in holding container 8, reaction container 17 may be empty or may contain the melt of the reaction product obtained by causing a reaction between the tungsten containing material and sodium nitrate in advance.

Furthermore, tungsten containing material 3 only needs to be a material containing tungsten, and may be, for example, WC—Co-based cemented carbide (WC-based cemented carbide) containing tungsten carbide and cobalt, WC—TiC—TaC—Co-based cemented carbide (WC—TiC-based cemented carbide) containing tungsten carbide, titanium carbide, tantalum carbide and cobalt, TiCN—WC—$Mo_2C$—Co—Ni-based cermet (TiCN-based cermet) containing titanium carbonitride, tungsten carbide, molybdenum carbide, cobalt and nickel, W—Ni-based heavy metal (W—Ni-based alloy) containing tungsten and nickel, or the like.

Furthermore, it is preferable that tungsten containing material 3 is a tungsten containing scrap from which a part of the surface is removed. The surface of the tungsten containing product such as a cemented carbide tool may be covered by a thin film such as TiC, TiN, TiCN or $Al_2O_3$ that is hard and has excellent abrasion resistance. Accordingly, the waste product of the tungsten containing product (tungsten containing scrap) from which a thin film is removed in advance is used as a tungsten containing material, which allows efficient development of the reaction between the tungsten containing material and the molten salt of sodium nitrate which will be described later.

It is preferable that the tungsten containing scrap is a hard scrap of the tungsten containing product such as a cemented carbide tool. In this case, tungsten containing material 3 can be held in holding container 8 with stability, which tends to allow stable development of the reaction between tungsten containing material 3 and the molten salt of sodium nitrate, as described later.

In this case, the hard scrap of the tungsten containing product means a solid waste product such as a tungsten containing product itself which cannot be used any more due to chipping, abrasion and the like, a part of the tungsten containing product separated from the main body due to chipping, and the like.

Then, reaction container 17 is heated by heating device 6 to heat tungsten containing material 3 contained in holding container 8, in which case tungsten containing material 3 is heated to a temperature equal to or higher than the temperature at which sodium nitrate is melted.

Then, holding container 8 containing tungsten containing material 3 is rotated within reaction container 17 to supply sodium nitrate 4 into sodium nitrate supply port 2. This allows sodium nitrate 4 to be supplied through sodium nitrate introduction pipe 2a onto the surface of tungsten containing material 3 heated as described above. Consequently, sodium nitrate 4 brought into contact with the surface of tungsten containing material 3 is melted into molten salt, which is then reacted with tungsten containing material 3, to thereby produce a reaction product containing sodium tungstate.

In other words, since reaction container 17 is heated to the temperature equal to or higher than the temperature at which sodium nitrate can be maintained in the state of molten salt, the exposed surface of tungsten containing material 3 is also heated to the temperature approximately similar thereto. Accordingly, for example, even when sodium nitrate in a solid state such as a powdery state is supplied onto the surface of tungsten containing material 3, sodium nitrate is melted on the surface of tungsten containing material 3 into molten salt. Then, a reaction occurs between the molten salt of sodium nitrate and the surface of tungsten containing material 3 brought into contact therewith, thereby producing a reaction product containing sodium tungstate. It is to be noted that sodium nitrate may be supplied in the state of molten salt.

For example, when tungsten containing material 3 is WC—Co-based cemented carbide (WC-based cemented carbide), the reaction represented by the following expression (1) corresponds to the most effectively developed main reaction among the reactions between tungsten containing material 3 and the molten salt of sodium nitrate.

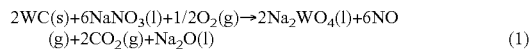
$$2WC(s)+6NaNO_3(l)+1/2O_2(g) \rightarrow 2Na_2WO_4(l)+6NO(g)+2CO_2(g)+Na_2O(l) \qquad (1)$$

In addition, when the reaction represented by the above-described expression (1) is carried out by oxygen which is supplied from oxygen-containing atmosphere and sodium nitrate, oxygen is insufficient for the reaction in the case of oxygen obtained from sodium nitrate can be additionally supplied from the oxygen-containing atmosphere. Consequently, while suppressing consumption of expensive sodium nitrate, the reaction can be smoothly developed to allow efficient production of sodium tungstate which is a main product of the above-described reaction.

It is to be noted that the oxygen-containing atmosphere is not particularly limited as long as the atmosphere contains oxygen, but may be, for example, an air atmosphere and the like.

For example, in the case where tungsten containing material 3 contains Co, Ni, TiC, TiN, or TaC, an oxoacid sodium salt such as $NaCo_2O_4$, $NaNiO_2$, $Na_8Ti_5O_{14}$ or $NaTaO_3$ may be produced, in addition to sodium oxide, as a by-product of the above-described reaction.

The reaction product produced by the reaction between tungsten containing material 3 and the molten salt of sodium nitrate 4 as described above becomes a melt which is then introduced as melt 9 together with the molten salt of unreacted sodium nitrate from the surface of tungsten containing material 3 through the openings of the side and the communication hole of the bottom in holding container 8 into reaction container 17.

Furthermore, melted sodium nitrate 4 which is contained in an unreacted state in melt 9 reacts with tungsten containing material 3 contained in holding container 8 through the openings of the side and the communication hole of the bottom in holding container 8. This reaction leads to production of a melt of the reaction product containing sodium tungstate, which is then further introduced into melt 9.

Furthermore, as the tungsten containing material and the molten salt of sodium nitrate are consumed in accordance with development of the above-described reaction, at least one of tungsten containing material 3 and sodium nitrate 4 is continuously or intermittently supplied.

In this case, tungsten containing material 3 and sodium nitrate 4 are supplied by continuously or intermittently at least one of tungsten containing material 3 and sodium nitrate 4 so as to keep the reaction speed enough to allow control of the reaction between the tungsten containing material and the molten salt of sodium nitrate.

Then, since the amount of melt 9 containing the reaction product containing sodium tungstate in reaction container 17 increases in accordance with development of the above-described reaction, melt 9 is continuously or intermittently discharged through discharge port 11 to the outside of reaction container 17.

In this way, at least one of tungsten containing material 3 and sodium nitrate 4 is continuously or intermittently supplied so as to keep the reaction speed enough to allow control of the reaction between tungsten containing material 3 and the molten salt of sodium nitrate 4. Then, melt 9 containing the reaction product containing sodium tungstate produced by the reaction between tungsten containing material 3 and the molten salt of sodium nitrate 4 is continuously or intermittently discharged through discharge port 11. Consequently, the reaction product containing sodium tungstate can be efficiently and continuously produced with safety.

It is to be noted that tungsten containing material 3 can be supplied, for example, by supplying the tungsten containing material into tungsten containing material supply port 1 to introduce tungsten containing material 3 through tungsten containing material introduction pipe 1a into holding container 8.

Furthermore, sodium nitrate 4 can be supplied, for example, by supplying sodium nitrate 4 into sodium nitrate supply port 2 to introduce sodium nitrate 4 through sodium nitrate introduction pipe 2a onto the surface of tungsten containing material 3 contained in holding container 8.

Furthermore, the timing for supplying tungsten containing material 3 can be determined, for example, by calculating the remaining amount of tungsten containing material 3 through measurement of the mass, detection of the liquid level position using laser or the like.

Furthermore, the timing for supplying sodium nitrate 4 can be determined, for example, by calculating the remaining amount of sodium nitrate 4 through measurement of the mass, detection of the liquid level position using laser or the like.

Furthermore, when the amount of melt 9 contained in reaction container 17 increases in accordance with development of the above-described reaction, tungsten containing material 3 contained in holding container 8 may be immersed in melt 9.

In this case, when entire tungsten containing material 3 is immersed in melt 9, the amount of produced nitrogen oxide is increased to cause a large quantity of gas to be generated within melt 9. This may cause overflow of melt 9 from reaction container 17. Accordingly, it is preferable that only a part of tungsten containing material 3 is immersed in melt 9.

It is preferable that at least half of tungsten containing material 3 is immersed in melt 9. In this case, the exposed portion of tungsten containing material 3 which is not covered by melt 9 is brought into direct contact with sodium nitrate, which leads to an increase in the reaction speed. However, the portion exposed from melt 9 facilitates smooth separation of the generated gas, and accordingly, overflow is less likely to occur. Consequently, the reaction with the molten salt of sodium nitrate can be developed with safety. Furthermore, the reaction speed is relatively low in the portion of tungsten containing material 3 immersed in melt 9, which allows moderate development of the reaction with the molten salt of sodium nitrate in melt 9. Therefore, the amount of gas to be generated is reduced to suppress overflow, which allows the reaction to proceed with safety. Accordingly, the reaction product containing sodium tungstate can be more efficiently produced.

It is to be noted that the phrase "at least half of the tungsten containing material is immersed in the melt" used herein means that the portion corresponding to at least half of the maximum height of a group of tungsten containing materials is immersed in the melt in the height direction of the group of tungsten containing materials.

Furthermore, it is preferable that the amount of tungsten containing material 3 immersed in melt 9 is kept approximately constant. In this case, since the reaction between the tungsten containing material and the molten salt of sodium nitrate can be performed at an approximately constant reaction speed, the reaction product containing sodium tungstate can be produced with enhanced safety.

The amount of tungsten containing material 3 immersed in melt 9 can be adjusted, for example, by moving rotation shaft 7 connected to holding container 8 in the upward and downward directions and/or by adjusting the amount of melt 9 in reaction container 17 by discharging melt 9 through discharge port 11.

Furthermore, the melting point of sodium tungstate is 698° C. Accordingly, when the temperature of sodium tungstate produced by the above-described reaction is decreased below 698° C., sodium tungstate will be present as a solid phase at the contact interface between the tungsten containing material and the molten salt of sodium nitrate. In this case, for example as described above, when sodium nitrate 4 in a solid state is supplied onto the exposed surface of tungsten containing material 3, sodium nitrate having a melting point of 308° C. is melted on the surface of sodium tungstate existing as a solid phase, which makes it difficult to reach the surface of tungsten containing material 3. Consequently, the reaction speed of the above-described reaction may be decreased.

Thus, in order to promote the reaction between the tungsten containing material and the molten salt of sodium nitrate, it is preferable to heat at least one of the tungsten containing material and the molten salt of sodium nitrate to a temperature of 700° C. or higher. In this case, at least a part of sodium tungstate can be brought into a state of a melt. In addition, while removing the melt of sodium tungstate from the contact interface between the tungsten containing material and the molten salt of sodium nitrate, the reaction between the tungsten containing material and the molten salt of sodium nitrate can be developed. Accordingly, it is more likely that sodium tungstate can be more efficiently produced.

In addition, in the case where the reaction product (sodium tungstate and its by-product) is brought into a state of a melt, the melt of the reaction product can also be removed from the surface of the tungsten containing material and introduced into melt 9.

Furthermore, when the tungsten containing material is TiCN-based cermet generally including a tungsten content of 20% or less, the amount of produced sodium tungstate is decreased. In this case, the melt is produced at a high temperature (850° C.) from the reaction product produced by the reaction between the tungsten containing material and the molten salt of sodium nitrate. In contrast, when the heating temperature during the reaction between the tungsten containing material and the molten salt of sodium nitrate is excessively high, the reaction is developed to the level at which the reaction cannot be controlled. Therefore, it is preferable that the heating temperature for at least one of the tungsten containing material and the molten salt of sodium nitrate is set at 850° C. or lower during the reaction between the tungsten containing material and the molten salt of sodium nitrate.

Furthermore, it is preferable that the total amount of sodium nitrate to be supplied is 1.2 times or more and 4 times or less of the total mass of the tungsten containing material. For example, according to the above-described expression (1), the ratio (B/A) between the mass (A) of the tungsten containing material and the mass (B) of sodium nitrate which contributes to the above-described reaction is approximately 1.3. However, the tungsten containing material made of WC-based cemented carbide also contains a bonding metal. Accordingly, when the above-described ratio (B/A) is actually 1.2 or more, it is more likely that the tungsten containing material can be completely reacted.

Furthermore, since it is considered that the reaction of TiC or TiCN proceeds as in the following expression (2), it is also considered that, when using the tungsten containing material made of TiCN-based cermet that contains TiCN as a main component and added with a less amount of WC, a large amount of sodium nitrate is required as compared with the case where the tungsten containing material made of the above-described WC-based cemented carbide is used.

$$5\text{TiC(s)} + 8\text{NaNO}_3(l) + 4\text{O}_2(g) \rightarrow \text{Na}_8\text{Ti}_5\text{O}_{14}(s) + 8\text{NO}(g) + 5\text{CO}_2(g) \quad (2)$$

The complete reaction of the tungsten containing material requires the above-described ratio (B/A) to be at least 4. Furthermore, even when the above-described ratio (B/A) exceeds 4, the tungsten containing material can be completely reacted, in which case the reaction may excessively proceed or there may remain sodium nitrate that is not used for the reaction. This may cause needless consumption of expensive sodium nitrate. Therefore, it is preferable that the above-described ratio (B/A) is 4 or less.

Figure 3:
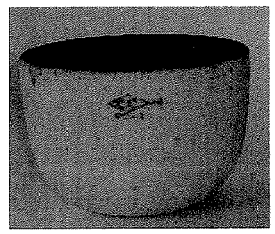
FIG. 3 is a photograph of a porcelain crucible after supplying sodium nitrate by each constant amount for 1.2 hours to produce sodium tungstate which is then cooled.
Figure 4:
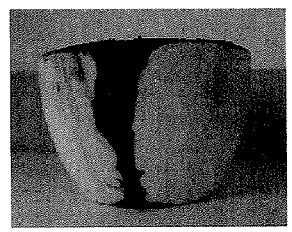
FIG. 4 is a photograph of the porcelain crucible after supplying sodium nitrate by each constant amount for 0.6 hours to produce sodium tungstate which is then cooled.
Figure 5:
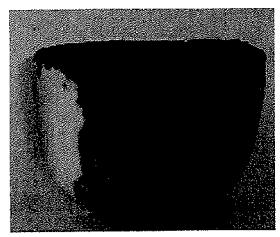
FIG. 5 is a photograph of the porcelain crucible after supplying sodium nitrate by each constant amount for 0.3 hours to produce sodium tungstate which is then cooled.

Furthermore, it was examined what change would occur when the time period for supplying sodium nitrate is changed while the total amount of sodium nitrate addition is fixed. More specifically, 70 g of WC—Co-based cemented carbide (WC-based cemented carbide) was heated to 720° C. within the porcelain crucible. Then, 120 g of sodium nitrate was added gradually by each constant amount onto the surface of WC—Co-based cemented carbide (WC-based cemented carbide) in respective cases for 1.2 hours, 0.6 hours and 0.3 hours, to produce sodium tungstate. FIGS. 3 to 5 each show the porcelain crucible at the time when sodium tungstate was produced and then cooled to a room temperature. It is to be noted that FIGS. 3, 4 and 5 each show the state of the above-described cooled porcelain crucible at the time when 120 g of sodium nitrate was added by each constant amount for 1.2 hours (FIG. 3), 0.6 hours (FIG. 4) and 0.3 hours (FIG. 5), respectively.

It is to be noted that the reaction rate of WC—Co-based cemented carbide (WC-based cemented carbide) (100×{(mass of WC-based cemented carbide before reaction)−(remaining amount of WC-based cemented carbide after reaction)}/(mass of WC-based cemented carbide before reaction)) was 99% (1.2 hours), 92% (0.6 hours) and 86% (0.3 hours). The reaction between sodium nitrate and WC—Co-based cemented carbide (WC-based cemented carbide) became active in accordance with addition of sodium nitrate for a short time period, and the exhaust gas by the reaction caused overflow of the reaction product. Consequently, the reaction rate was lowered.

When further examination has been made based on the above-described results, it has been found that sodium nitrate is supplied for 1 hour or more, which allows a high reaction rate to be achieved without causing overflow of the reaction product. Furthermore, it has been found that sodium nitrate is supplied over a time period longer than 4.5 hours, which causes an increase in energy consumption which is uneconomical.

Furthermore, it is preferable that sodium nitrate 4 is supplied so as to be uniformly distributed throughout tungsten containing material 3. For example, when a component such as a sieve is provided in the upper portion of holding container 8, or when the relative positional relationship between sodium nitrate introduction pipe 2a serving as a supply port for substantially supplying sodium nitrate 4 into reaction container 17 and holding container 8 containing tungsten containing material 3 is set variable, sodium nitrate 4 can be supplied so as to be uniformly distributed throughout tungsten containing material 3.

In addition, the mechanism for changing the relative positional relationship between sodium nitrate introduction pipe 2a and holding container 8 may includes, for example, the mechanism for moving sodium nitrate introduction pipe 2a, the mechanism for rotating holding container 8 about rotation shaft 7, the mechanism for moving holding container 8 in the upward and downward directions while rotating holding container 8 about rotation shaft 7, or the like.

Furthermore, as shown in the reaction represented by each of the above-described expressions (1) and (2), when a reaction occurs between the tungsten containing material and the molten salt of sodium nitrate, the exhaust gas containing toxic nitrogen oxide is generated as a by-product. For example, as in the reaction represented by the following expression (3), nitrogen monoxide (NO) generated by the reaction of each of the above-described expressions (1) and (2) can be decomposed into nitrogen and water by mixing ammonia gas in the presence of an oxide catalyst of vanadium or titanium of a high temperature.

$$4NO+4NH_3+O_2 \rightarrow 4N_2+6H_2O \qquad (3)$$

It is preferable that the concentration of the nitrogen oxide in the exhaust gas generated together with a reaction product is set to be continuously at 150 ppm or lower. In this case, the exhaust gas containing a low concentration of toxic nitrogen oxide can be discharged. Accordingly, the safety of the operation can be improved while an adverse effect is less likely to be exerted on the environment.

In addition, the reaction product other than the exhaust gas generated by the reaction between the tungsten containing material and the molten salt of sodium nitrate can be introduced into melt 9 as a melt. Then, melt 9 containing the reaction product is discharged through discharge port 11 and introduced into a container 18 disposed outside of reaction container 17.

In this way, melt 9 within reaction container 17 is discharged through discharge port 11, which allows adjustment of the amount of melt 9 contained in reaction container 17, and also allows continuous development of the reaction between the tungsten containing material and the molten salt of sodium nitrate without stopping the operation. Therefore, sodium tungstate can be more efficiently produced as compared with the method disclosed in Patent Document 1 that requires the reaction to be stopped for every batch processing.

Furthermore, when the amount of melt 9 within reaction container 17 is increased or decreased without keeping it constant, it is preferable that holding container 8 containing tungsten containing material 3 is movable in the vertical direction. For example, in the case where melt 9 in reaction container 17 is collectively transferred to external container 18 at the time when the amount of melt 9 is increased to some extent, and also in the case where holding container 8 is configured to have a bottom provided with a communication hole and a side formed in a mesh pattern as described above, it is preferable that holding container 8 is also configured such that it can be raised in accordance with an increase in the amount of melt 9. Furthermore, holding container 8 is configured to have a fixed depth and also configured to have a side in which only an upper portion is formed in a mesh pattern. This causes melt 9 accumulated to the level equal to or greater than the prescribed amount to be overflown through the mesh, to thereby keep the liquid level constant. Thus, the molten salt of the unreacted sodium nitrate that did not react in the upper portion of the side of holding container 8 may be reacted with tungsten containing material 3 contained in the lower portion of holding container 8.

Furthermore, in order to keep the amount of melt 9 constant, for example, discharge port 11 connected to outside of reaction container 17 may be configured in a siphon type to thereby allow the height of the liquid level of melt 9 to be kept constant.

Furthermore, a protection container 13 provided with a heating device 14 is provided outside of container 18 disposed external to reaction container 17. A stirrer which is not shown is disposed inside of container 18. Furthermore, container 18 is movable into and out of outer wall portion 10 shown in FIG. 1 by a plurality of rollers 12 arranged on the bottom of protection container 13.

In addition, container 18 containing melt 9 including the reaction product produced by the reaction between the tungsten containing material and the molten salt of sodium nitrate is moved to the outside of outer wall portion 10 of the apparatus shown in FIG. 1, and a reductant is introduced into melt 9 contained in container 18.

Introduction of the reductant into melt 9 allows reduction in a valence of the metallic elements constituting the ions of metal peroxide corresponding to impurities in melt 9. Consequently, when melt 9 is dissolved in water in the subsequent process, the metallic elements regarded as impurities can be precipitated in the state of an oxide as a water-insoluble matter.

In other words, melt 9 contained in container 18 may contain peroxide ions of impurity metal such as chromium and vanadium, for example. These metal peroxide ions are changed into water-soluble hexavalent or pentavalent oxoacid sodium salt, but not deposited as a precipitate when melt 9 is cooled and dissolved in water. Accordingly, these metal peroxide ions cannot readily be separated by filtration and the like.

Thus, a reductant having a reduction action is introduced in advance before melt 9 containing these metal peroxide ions is dissolved in water. This causes a decrease in the valence of the metallic elements constituting metal peroxide ions to achieve water-insoluble metal oxides. In addition, in the case where melt 9 containing the above-described metal oxides is dissolved in water, these metal oxides are insoluble in water and deposited as precipitates. Therefore, these metal oxides can readily be separated from the sodium tungstate aqueous solution by filtration and the like.

For example, in the case where melt 9 contains chromium which is an impurity metal as a chromate ion ($CrO_4^{2-}$) which is a metal peroxide ion, carbon (C), tungsten (W) or tungsten carbide (WC) is introduced as a reductant, thereby allowing production of water-insoluble dichromium trioxide ($Cr_2O_3$), for example, as represented in the following expressions (4) to (6).

$$2NaCrO_4 + 2C \rightarrow Na_2O + Cr_2O_3 + 2CO_2 \qquad (4)$$

$$2NaCrO_4 + W \rightarrow Na_2WO_4 + Cr_2O_3 + 1/2O_2 \qquad (5)$$

$$2NaCrO_4 + WC + 1/2O_2 \rightarrow Na_2WO_4 + Cr_2O_3 + CO_2 \qquad (6)$$

For example, in the case where melt 9 contains vanadium which is an impurity metal as a vanadate ion ($VO^{3-}$) which is a metal peroxide ion, carbon (C) or tungsten (W) is introduced as a reductant, thereby allowing production of water-insoluble divanadium trioxide ($V_2O_3$), for example, as represented in the following expressions (7) to (9).

$$2NaVO_3 + C \rightarrow V_2O_3 + Na_2CO_3 \qquad (7)$$

$$14NaVO_3 + 4W \rightarrow 4Na_2WO_4 + 6V_2O_3 + (Na_2O)_3(V_2O_5) \qquad (8)$$

$$14NaVO_3 + 4WC \rightarrow 6V_2O_3 + 4Na_2WO_4 + 4C + (Na_2O)_3(V_2O_5) \qquad (9)$$

As described above, a reductant is introduced into melt 9 containing peroxide ions of the impurity metal before water is introduced, to thereby produce an oxide of water-insoluble impurity metal in advance. This allows melt 9 to exist as a precipitate when melt 9 is dissolved in water and also allows the precipitate to be readily separated by filtration and the like. Therefore, the sodium tungstate aqueous solution of high purity can be obtained.

It is to be noted that the reductant is not particularly limited as long as it allows a decrease in the valence of the metallic elements constituting peroxide ions of the impurity metal in melt 9. Specifically, it is preferable to use soft scraps including at least one selected from the group consisting of carbon, tungsten and tungsten carbide, in which case the soft scraps may further contain tungsten oxide. This tends to allow a further decrease in the content of the impurities other than sodium tungstate in melt 9.

For example, there is a case where soft scraps contain tungsten carbide and tungsten and further contain tungsten oxide. This is preferable in the point that the reaction represented in each of the following expressions (10) to (12) allows production of sodium tungstate from tungsten carbide and sodium oxide and also allows a decrease in the content of sodium peroxide or sodium oxide which exists as impurities with instability.

$$WC + Na_2O + 5/2O_2 \rightarrow Na_2WO_4 + CO_2 \qquad (10)$$

$$W + Na_2O_2 + O_2 \rightarrow Na_2WO_4 \qquad (11)$$

$$WO_3 + Na_2O_2 \rightarrow Na_2WO_4 + 1/2O_2 \qquad (12)$$

The soft scraps used herein mean powdery substances. Particularly, the soft scraps of a tungsten containing product correspond to collected powder such as scraps produced during production of the tungsten containing product and scraps produced by the processing using the tungsten containing product.

Furthermore, it is preferable that not only the soft scraps of the tungsten containing product but also those further containing tungsten oxide are used as reductants. In this case, for example, as shown in the reaction of the above-described expressions (10) and (11), oxygen required for the reaction between sodium oxide and sodium peroxide can be supplied, which tends to allow more efficient removal of sodium oxide.

Furthermore, in order to efficiently reduce the above-described impurity metallic elements, it is preferable that the temperature of the melt at which the reductant is introduced is 700° C. or higher and 850° C. or lower.

Furthermore, it is preferable that the amount of the reductant to be introduced is 0.05 times or more and 0.45 times or less of the mass of melt 9 containing the reaction product, and, more preferably, 0.1 times or more and 0.4 times or less. The amount of the reductant to be introduced is 0.05 times or more and 0.45 times or less, particularly, 0.1 times or more and 0.4 times or less, of the mass of melt 9 containing the reaction product, which tends to allow sufficient reduction of the peroxidized impurity metallic elements in the reaction product to thereby obtain a sodium tungstate aqueous solution of high purity.

After the above-described reductant is introduced, protection container 13 and heating device 14 are removed from container 18. Melt 9 contained in container 18 is then cooled and solidified, into which water is introduced to dissolve melt 9 in water. Consequently, the metal which is an impurity reduced by the above-described reductant is precipitated in the state of an oxide in the aqueous solution, and water-soluble sodium tungstate can be obtained in the state of an aqueous solution.

After the above-described reductant is introduced, protection container 13 and heating device 14 are removed from container 18. Melt 9 contained in container 18 is then cooled and solidified, into which water is introduced to dissolve melt 9 in water. Consequently, the metal which is an impurity reduced by the above-described reductant is precipitated in the state of an oxide in the aqueous solution, and water-soluble sodium tungstate can be obtained in the state of an aqueous solution.

Then, the aqueous solution of melt 9 is filtered to remove the above-described metal oxide as a precipitate, thereby allowing the sodium tungstate aqueous solution of high purity to be obtained.

It is preferable to adjust a pH to fall within the range of 8.5 or more and 10 or less by adding acid (preferably, sulfuric acid) to the aqueous solution obtained after dissolving, in water, melt 9 used in the case where the impurities are removed with precipitates by adjustment of pH. In this case, Al and Si can be precipitated while suppressing elution of Co in the aqueous solution, which allows the number of times of filtration to be reduced to simplify the process, and also allows the equipment such as a solution tank to be eliminated.

In other words, when melt 9 obtained after the above-described reductant is introduced is dissolved in water, the aqueous solution may contain impurities such as Al and Si and the residues insoluble in water may contain Co and the like. In this case, after the residues containing Co are separated by filtration, acid is added to the aqueous solution to produce precipitates of each of Al and Si (for example, $Al(OH)_3$, $H_2SiO_3$ and the like), thereby also allowing the precipitates to be filtered again. However, as described above, the pH is adjusted to fall within the range of 8.5 or more and 10 or less by adding acid to the aqueous solution of melt 9 into which the reductant has been introduced. This allows Al and Si to be precipitated and contained in the residues containing Co without elution of Co into the aqueous solution. Accordingly, the number of times of filtration can be reduced to simplify the process, and the equipment such as a solution tank can also be eliminated.

Furthermore, oxoacid sodium salt such as $NaCo_2O_4$, $NaNiO_2$, $Na_8Ti_5O_{14}$, or $NaTaO_3$ in melt 9 can be removed as described below, for example.

First, melt 9 is dissolved in water to hydrolyze the above-described oxoacid sodium salt. This allows the above-described oxoacid sodium salt to be converted into a water-insoluble matter (for example, $Co_3O_4$, $NiO$, $NiO_2$, $Na_3TaO_4$, $Ta_2O_5$, and the like).

Then, the aqueous solution obtained after hydrolysis of the above-described oxoacid sodium salt is filtered to thereby allow the water-insoluble matter (for example, $Co_3O_4$, $NiO$, $NiO_2$, $Na_3TaO_4$, $Ta_2O_5$, and the like) to be separated from the sodium tungstate aqueous solution. Consequently, the sodium tungstate aqueous solution of high purity can be obtained.

As described above, the sodium tungstate aqueous solution of high purity can be obtained in the present invention.

Figure 2:
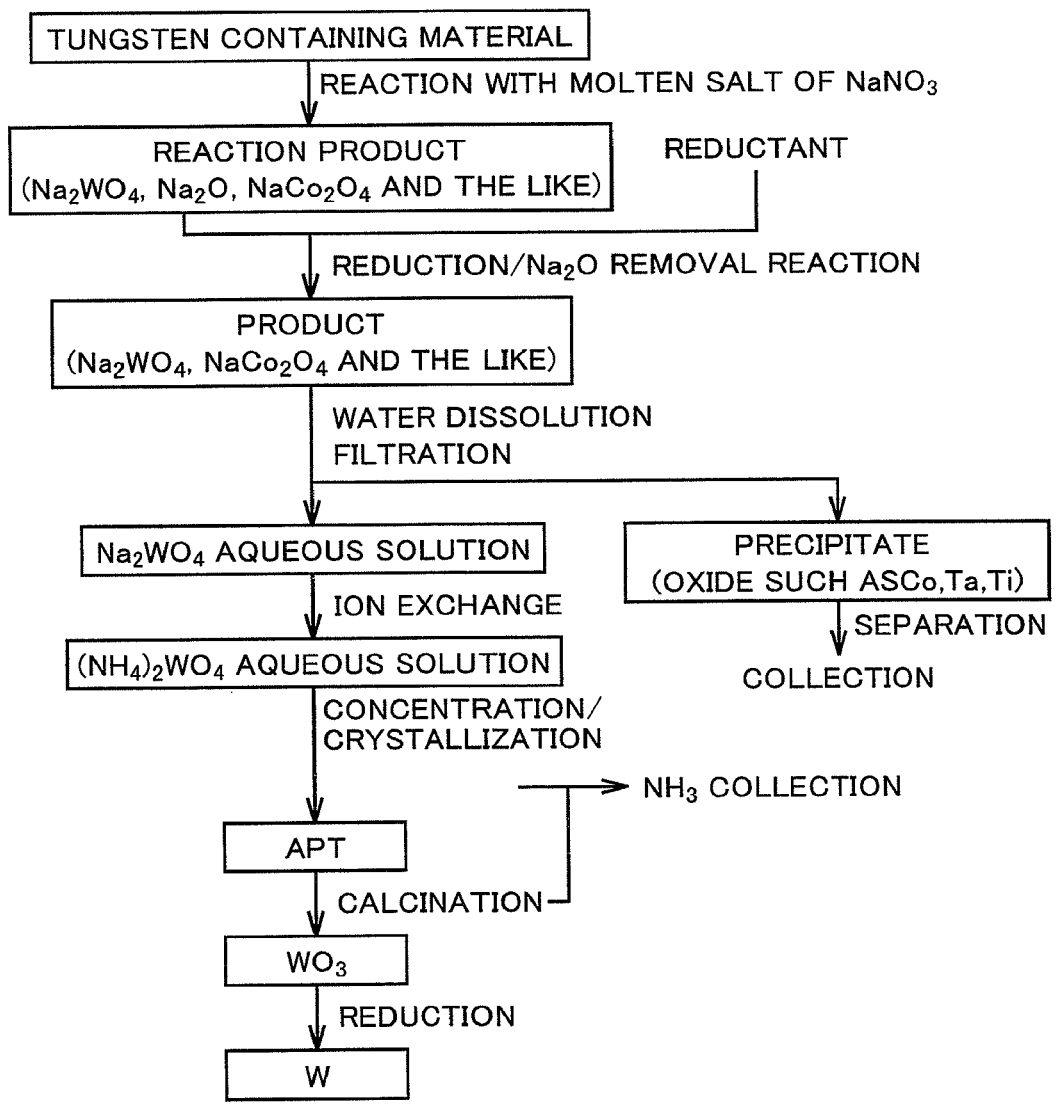
FIG. 2 is a flowchart showing an example of a method for collecting tungsten in accordance with the first embodiment.

FIG. 2 is a flowchart showing a method for collecting tungsten in the first embodiment which is an example of the method for collecting tungsten according to the present invention. With reference to FIG. 2, an example of the method for collecting tungsten in accordance with the present invention using the above-described method for producing sodium tungstate will be hereinafter described.

First, the tungsten containing material and the molten salt of sodium nitrate are reacted with each other in an oxygen-containing atmosphere, to obtain, for example, a melt-like reaction product ($Na_2WO_4$, $Na_2O$, and $NaCo_2O_4$ and the like). In this case, sodium nitrate can be effectively used by supplying oxygen from the oxygen-containing atmosphere.

Then, the by-product ($Na_2O$, $NaCo_2O_4$ and the like) of the reaction product obtained as described above is reduced by a reductant as described above, and $Na_2O$ and $Na_2O_2$ are also removed by the reaction represented by each of the above-described expressions (10) to (12) and the like, to thereby obtain a product ($Na_2WO_4$, $NaCo_2O_4$ and the like).

Then, the product obtained as described above ($Na_2WO_4$, $NaCo_2O_4$ and the like) is dissolved in water, into which acid is added for hydrolysis which is followed by filtration. Consequently, water-insoluble precipitates (for example, oxides such as Co, Ta or Ti) are separated from the sodium tungstate aqueous solution. The above-described processes can be performed using the apparatus shown in FIG. 1, as described above.

It is to be noted that the above-described precipitates (for example, oxides such as Co, Ta or Ni) are collected after separation.

With regard to the sodium tungstate ($Na_2WO_4$) aqueous solution, for example, ion exchange using an ion exchange resin is employed to substitute ammonium ions for sodium ions to achieve an ammonium tungstate (($NH_4)_2WO_4$) aqueous solution.

Then, the ammonium tungstate (($NH_4)_2WO_4$) aqueous solution is concentrated to cause crystallization of ammonium paratungstate (APT). At this time, the ammonia ($NH_3$) gas generated during concentration of the ammonium tungstate (($NH_4)_2WO_4$) aqueous solution is collected.

Then, ammonium paratungstate (APT) is calcined to obtain tungsten oxide ($WO_3$). At this time, the ammonia ($NH_3$) gas generated during calcination of ammonium paratungstate (APT) is also collected.

Then, tungsten oxide ($WO_3$) is reduced to obtain tungsten (W), which allows tungsten (W) to be collected.

Although the description has been made in the above with regard to the case where sodium nitrate is used as an oxidant, sodium nitrite may be used as an oxidant in place of sodium nitrate in the present invention.

Furthermore, although the description has been made in the above with regard to the case where sodium nitrate is supplied into the tungsten containing material, the tungsten containing material may also be supplied into sodium nitrate in the present invention.

Second Embodiment

Figure 6:
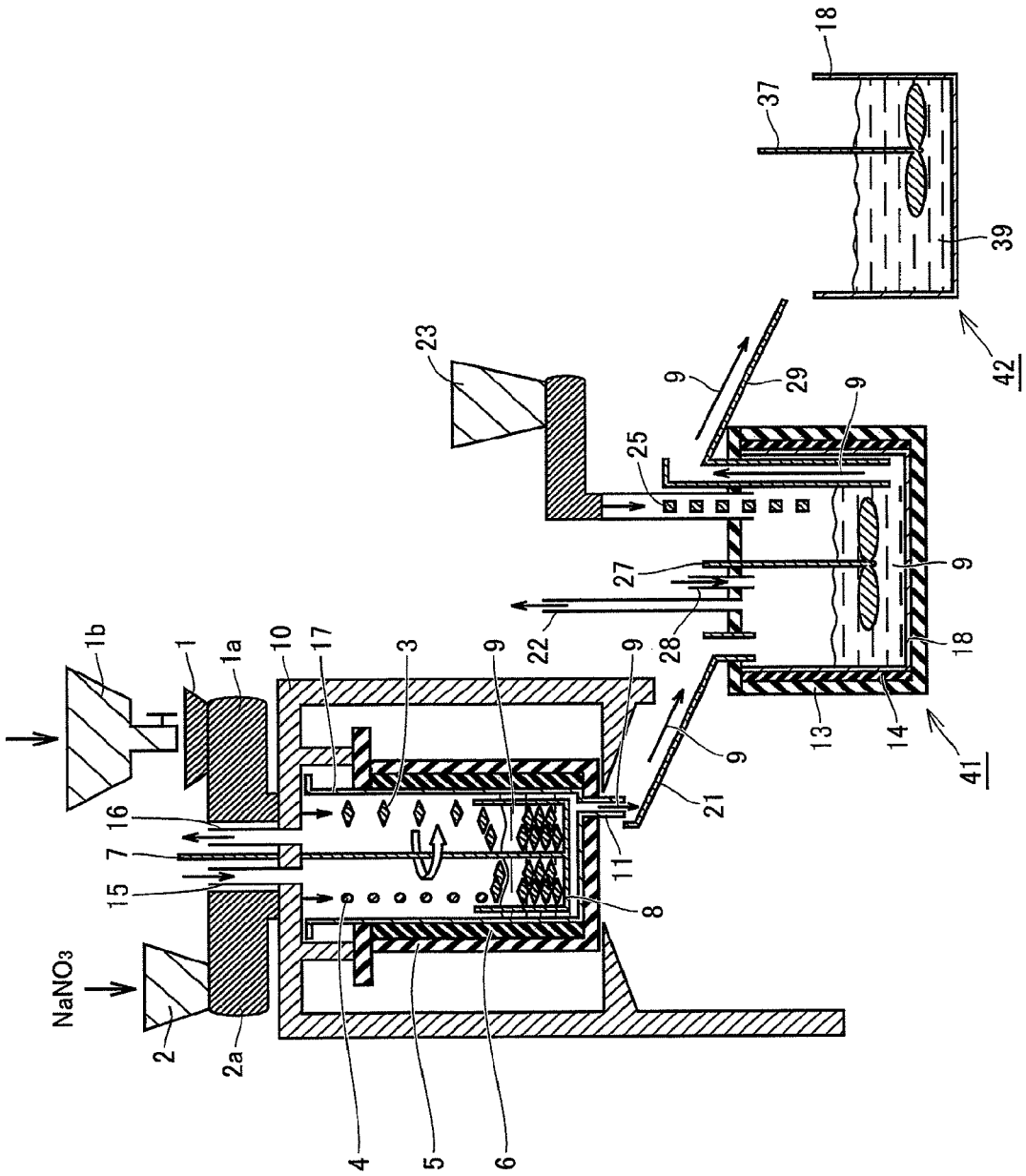
FIG. 6 is a schematic configuration diagram of an apparatus for producing sodium tungstate in accordance with the second embodiment.

FIG. 6 is a schematic configuration diagram of an apparatus for producing sodium tungstate in accordance with the second embodiment which is another example of the apparatus for producing sodium tungstate used in the present invention. The production apparatus shown in FIG. 6 is characterized by the following points (a) to (h).

(a) With regard to the tungsten containing material, a storage unit 1b capable of storing, for example, the tungsten containing material of several 100 kilograms is provided above tungsten containing material supply port 1. The tungsten containing material is automatically supplied through a supply conveyor (not shown) and tungsten containing material supply port 1 into tungsten containing material introduction pipe 1a such as a quantitative supply hopper. Consequently, the amount of the tungsten containing material to be dissolved can be increased to allow improvement in productivity of sodium tungstate.

(b) Sodium nitrate is supplied through sodium nitrate supply port 2 into sodium nitrate introduction pipe 2a, for example, using a flexible container (not shown) of several 100 kilograms. This allows an increased efficiency of the operation for supplying sodium nitrate 4.

(c) A holding furnace 41 is disposed obliquely below discharge port 11. This allows an automatic supply device 23 to be disposed above holding furnace 41. Thus, the processing of melt 9 by introduction of the reductant can be performed simultaneously while continuously dissolving the tungsten containing material. Consequently, the productivity of sodium tungstate can be improved.

(d) Melt 9 discharged through discharge port 11 is introduced into holding furnace 41 through a trough 21. Trough 21 is not enclosed but opened. Accordingly, the problem of clogging of the pipe resulting from solidification of melt 9 can be solved, and the maintenance can also be readily performed when melt 9 is adhered to the bottom of trough 21.

(e) Automatic supply device 23 for soft scraps is provided as a device for supplying a reductant. Soft scraps 25 are introduced from automatic supply device 23 into holding furnace 41. In that case, it is preferable that the roasted powder of the soft scraps obtained as oxides by roasting the soft scraps in advance is also introduced into holding furnace 41 together with soft scraps 25. This is because the processing of melt 9 by introduction of the soft scraps can be more efficiently performed when a part of the soft scraps is roasted and then oxidized (roasted powder) in advance before it is introduced into holding furnace 41. It is to be noted that the reaction caused by introduction of soft scraps 25 is represented, for example, by the following expression (10) and the reaction caused by introduction of the soft scraps (roasted powder) is represented, for example, by the following expression (12'). Furthermore, automatic supply device 23 is provided with a function for quantitative supply and is also capable of controlling the introduction distribution.

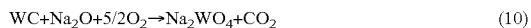

$$WC+Na_2O+5/2O_2 \rightarrow Na_2WO_4+CO_2 \quad (10)$$

$$WO_3+Na_2O \rightarrow Na_2WO_4 \quad (12')$$

(f) Holding furnace 41 is provided with a stirrer 27 and also provided at its upper portion with a dust-collecting outlet port 22. When melt 9 is stirred by stirrer 27, the reaction of melt 9, soft scraps 25 and soft scraps (roasted powder: tungsten oxide) can be promoted. Furthermore, dust-collecting outlet port 22 allows soft scraps 25 and the soft scraps (roasted powder) floating above melt 9 to be discharged to the outside of holding furnace 41.

(g) It is assumed that melt 9 is discharged in a pressure extrusion manner from holding furnace 41 after the processing by introduction of soft scraps 25 and the soft scraps (roasted powder). The pressure extrusion manner is employed, which eliminates the need to use a valve to control the amount of melt 9 to be discharged from holding furnace 41. Accordingly, clogging in the valve can be effectively prevented. When melt 9 is discharged from holding furnace 41 in a pressure extrusion manner, gas is introduced through a gas introduction port 28 into holding furnace 41 to raise the pressure within holding furnace 41. Then, the above-described processed melt 9 is discharged through a melt discharge passage 29 to the outside of holding furnace 41. Consequently, the amount of melt 9 to be discharged can be freely controlled by the amount of the gas to be introduced through gas introduction port 28.

(h) A water dissolution bath 42 including container 18 containing water 39 in advance and stirrer 37 is disposed obliquely below holding furnace 41. This allows melt 9 to directly flow from holding furnace 41 into water 39, thereby facilitating dissolution of melt 9 into water 39 through stir by stirrer 37. Consequently, the productivity of sodium tungstate can be enhanced.

Thus, the amount of melt 9 to be discharged is freely controlled, to thereby allow melt 9 in the appropriately dispersed state to be dissolved in water 39 so as to prevent melt 9 from being solidified into a large mass. Consequently, it becomes possible to prevent a large mass which is a solidified melt 9 from reaching the bottom of container 18, thereby also preventing the contents in container 18 from coming to a boil locally starting at the bottom thereof.

Furthermore, melt 9 can also be efficiently dissolved in water 39 by appropriately distributing melt 9.

Since the description in the present embodiment other than that in the above is the same as that of the first embodiment, description thereof will not be repeated.

Third Embodiment

Figure 7:
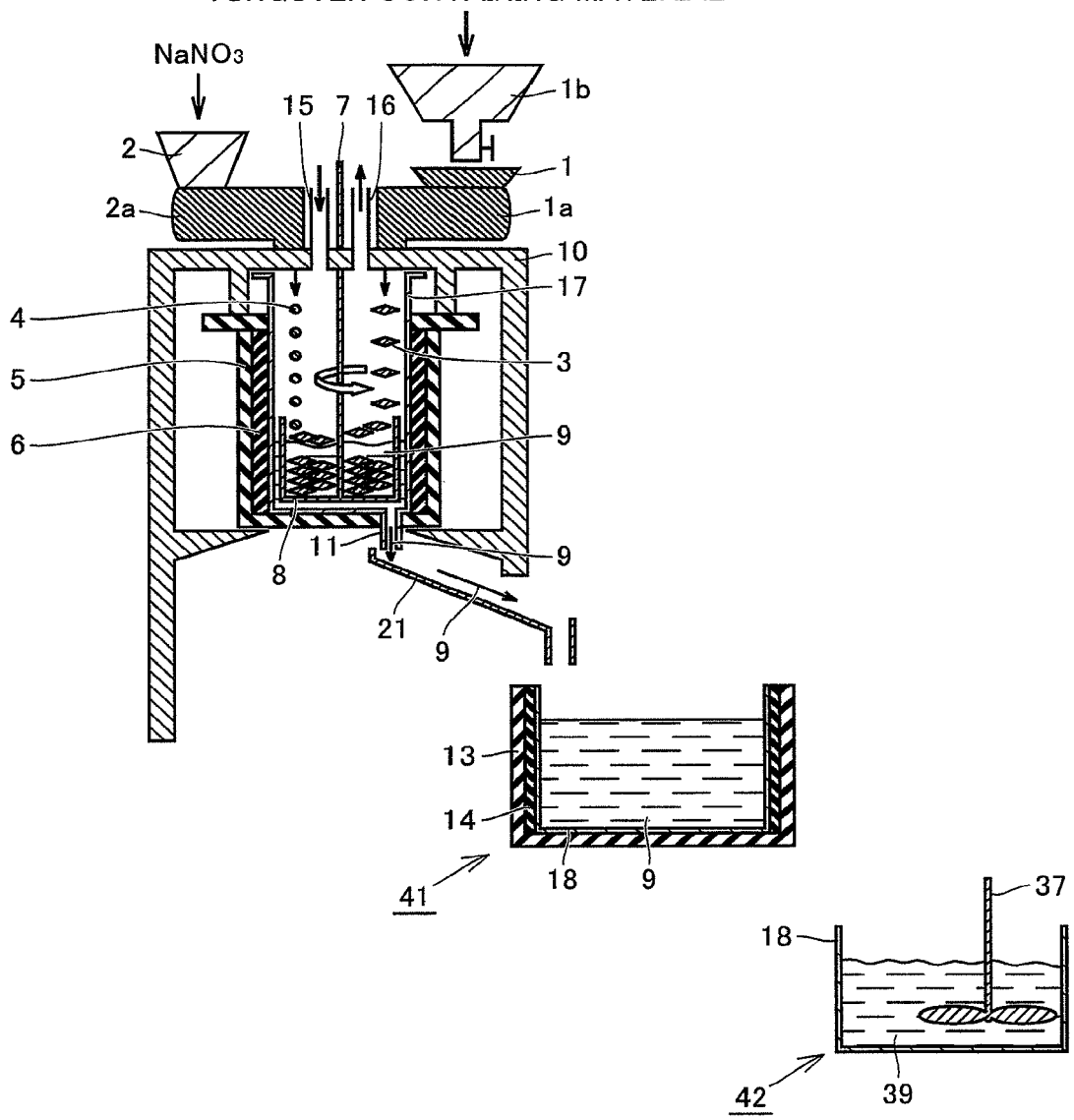
FIG. 7 is a schematic configuration diagram of an apparatus for producing sodium tungstate in accordance with the third embodiment.

FIG. 7 is a schematic configuration diagram of an apparatus for producing sodium tungstate in accordance with the third embodiment which is a still another example of the apparatus for producing sodium tungstate used in the present invention. The production apparatus shown in FIG. 7 is characterized by the following point (i) instead of the above-described point (g) in the second embodiment.

Figure 8:
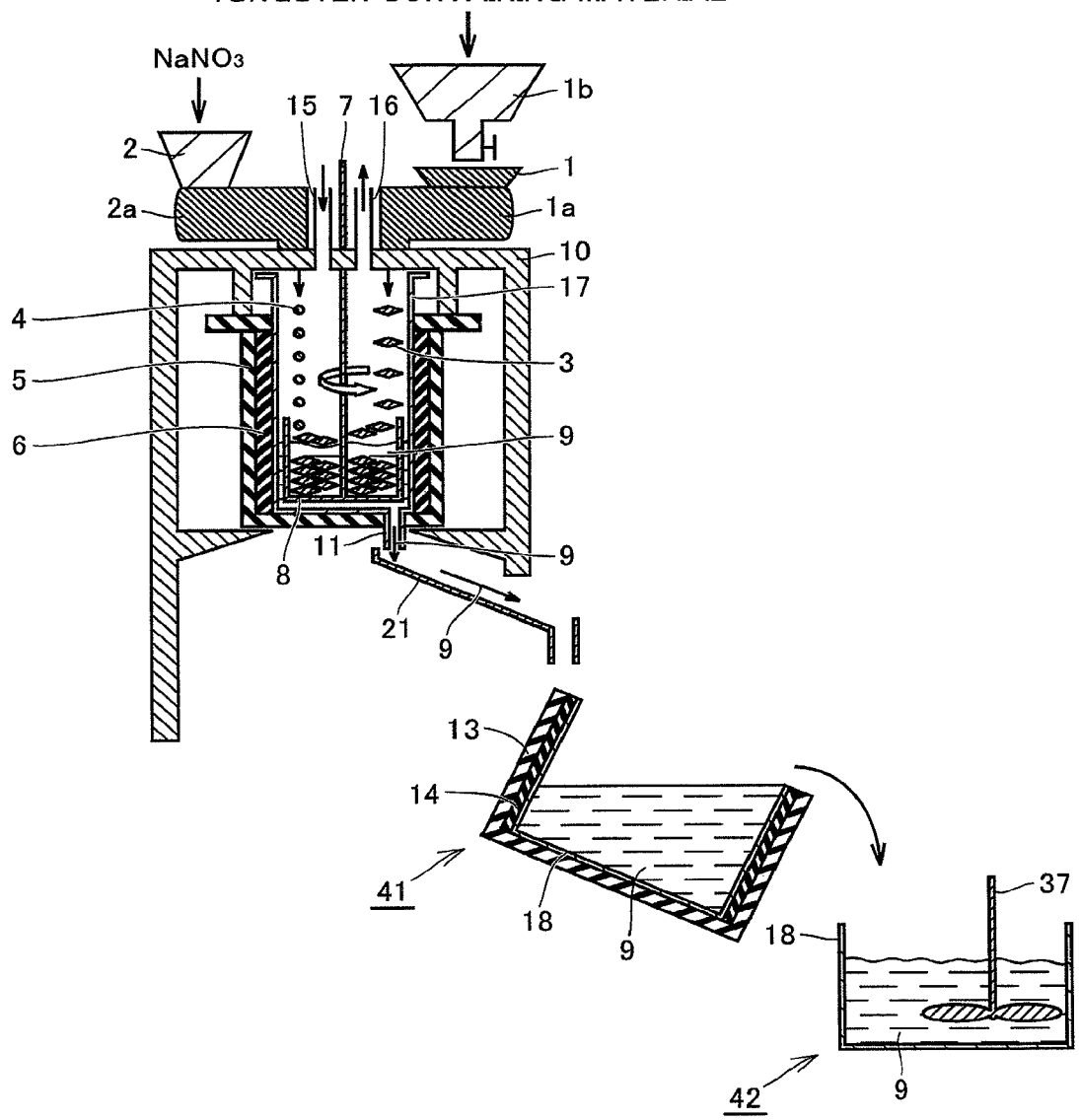
FIG. 8 is a schematic configuration diagram after tilting a holding furnace of the apparatus for producing sodium tungstate in accordance with the third embodiment.

(i) Melt 9 is discharged from holding furnace 41 to water dissolution bath 42 by means of a tilt mechanism. In other words, holding furnace 41 (a soft scrap supply mechanism and a stirrer are not shown) into which soft scraps 25 and soft scraps (roasted powder) have been introduced is, for example, separated from the soft scrap supply mechanism and the stirrer, and then tilted as shown in the schematic configuration diagram in FIG. 8. This causes melt 9 contained in holding furnace 41 to be discharged into water dissolution bath 42. Accordingly, the equipment can be simplified as compared with the above-described pressure extrusion type in (g), and the cost of the apparatus can also be reduced.

EXAMPLES

Examples 1 to 22

First, a reaction container made of stainless steel having an inner volume of 1.7 liters was disposed within an electric furnace which can be uniformly heated. Various types of reactants (A) shown in the following Table 1 were introduced into the reaction container. Then, the reactants (A) were heated in the atmosphere to each reaction temperature shown in Table 1.

Then, various types of reactants (B) shown in the following Table 1 were gradually added by a small amount at certain time intervals for their respective supply time periods shown in the following Table 1 to the reactants (A) heated within the reaction container, to thereby cause a reaction between the reactants (A) and the reactants (B).

In Examples 1 to 22, at least one of the conditions including reactant (A), reactant (B), mass ratio of the reactants (B/A), supply time period (time), and reaction temperature (° C.) was changed for undergoing the above-described reactions. Then, evaluations were made with regard to the reaction rate of the tungsten containing material and whether overflow of the reaction product from the reaction container occurred or not. The results are shown in Table 1.

It is to be noted that the mass ratio (B/A) shown in Table 1 represents the ratio of the total mass of the amount of the reactant (B) supplied to the reaction container with respect to the total mass of the reactant (A) contained in the reaction container.

Furthermore, the reaction rate (%) shown in Table 1 was calculated by the following expression (13).

Reaction rate (%)=(100×{(mass of tungsten containing material before reaction)−(remaining amount of tungsten containing material after reaction)}/(mass of tungsten containing material before reaction)) (13)

Furthermore, it was evaluated based on the following criteria whether overflow of the reaction product from the reaction container occurred or not, as shown in Table 1.

Overflow occurred . . . . It can be visually clearly confirmed that the reaction product is adhered to the outer surface of the reaction container.

Overflow did not occur . . . . It can be visually confirmed that little reaction product is adhered to the outer surface of the reaction container.

(WC-based cemented carbide) was supplied to sodium nitrate (NaNO$_3$) or sodium nitrite (NaNO$_2$), it was confirmed that the tungsten containing material could be sufficiently reacted when the total amount of the supplied tungsten containing material was 1.2 times or more of the total mass of NaNO$_3$ or NaNO$_2$ (when the reciprocal number of the mass ratio (B/A) in Table 1 was 1.2 or more).

Furthermore, as shown in Example 13 in Table 1, in the case where the tungsten containing material (TiCN-based

TABLE 1

|  | Reactant (A) Heated in Reaction Container | Reactant (B) Supplied to Reaction Container | Mass Ratio (B/A) | Supply Time Period (Time) | Reaction Temperature (° C.) | Reaction Rate (%) | Whether or not Overflow of Reaction Product Occurred |
|---|---|---|---|---|---|---|---|
| Example 1 | WC-based Cemented Carbide | NaNO$_3$ | 1.2 | 1.2 | 720 | 98 | Not Occurred |
| Example 2 | WC-based Cemented Carbide | NaNO$_3$ | 1.2 | 1.0 | 720 | 96 | Not Occurred |
| Example 3 | WC-based Cemented Carbide | NaNO$_3$ | 1.4 | 4.5 | 750 | 100 | Not Occurred |
| Example 4 | WC-based Cemented Carbide | NaNO$_3$ | 1.5 | 1.1 | 700 | 100 | Not Occurred |
| Example 5 | WC-based Cemented Carbide | NaNO$_3$ | 1.2 | 1.0 | 700 | 95 | Not Occurred |
| Example 6 | WC-based Cemented Carbide | NaNO$_2$ | 2.1 | 2.5 | 710 | 95 | Not Occurred |
| Example 7 | WC-TiC-based Cemented Carbide | NaNO$_3$ | 1.5 | 1.5 | 770 | 97 | Not Occurred |
| Example 8 | WC-TiC-based Cemented Carbide | NaNO$_3$ | 1.7 | 1.0 | 720 | 99 | Not Occurred |
| Example 9 | TiCN-based Cermet | NaNO$_2$ | 4.0 | 1.0 | 850 | 96 | Not Occurred |
| Example 10 | W-Ni-based Alloy | NaNO$_3$ | 1.2 | 3.0 | 730 | 100 | Not Occurred |
| Example 11 | NaNO$_3$ | WC-based Cemented Carbide | 0.75 | 2.0 | 730 | 96 | Not Occurred |
| Example 12 | NaNO$_2$ | WC-based Cemented Carbide | 0.45 | 1.5 | 710 | 94 | Not Occurred |
| Example 13 | NaNO$_3$ | TiCN-based Cermet | 0.25 | 1.0 | 850 | 93 | Not Occurred |
| Example 14 | WC-based Cemented Carbide | NaNO$_3$ | 1.0 | 1.2 | 720 | 81 | Not Occurred |
| Example 15 | WC-based Cemented Carbide | NaNO$_3$ | 1.0 | 1.0 | 680 | 72 | Not Occurred |
| Example 16 | WC-based Cemented Carbide | NaNO$_3$ | 1.3 | 0.50 | 750 | 85 | Occurred |
| Example 17 | WC-based Cemented Carbide | NaNO$_3$ | 1.2 | 0.83 | 680 | 89 | Occurred |
| Example 18 | WC-based Cemented Carbide | NaNO$_3$ | 1.1 | 0.67 | 720 | 84 | Occurred |
| Example 19 | WC-based Cemented Carbide | NaNO$_3$ | 1.2 | 0.33 | 720 | 86 | Occurred |
| Example 20 | WC-TiC-based Cemented Carbide | NaNO$_3$ | 1.5 | 0.42 | 730 | 87 | Occurred |
| Example 21 | NaNO$_2$ | WC-based Cemented Carbide | 0.80 | 1.5 | 680 | 75 | Not Occurred |
| Example 22 | NaNO$_3$ | WC-based Cemented Carbide | 0.70 | 0.83 | 720 | 88 | Occurred |

As shown in Examples 1 to 6 and 14 to 19 in Table 1, in the case where the above-described reactant (A) was WC-based cemented carbide, it was confirmed that the reaction rate of WC-based cemented carbide was high when the mass ratio (B/A) was 1.2 or more, and also confirmed that overflow of the reaction product did not occur when the supply time period of the reactant (B) was 1 hour or more.

Furthermore, as shown in Examples 7, 8 and 20 in Table 1, in the case where the above-described reactant (A) was WC—TiC-based cemented carbide, it was confirmed that the reaction rate of WC—TiC-based cemented carbide was high when the mass ratio (B/A) was 1.5 or more, and also confirmed that overflow of the reaction product did not occur when the supply time period of the reactant (B) was 1 hour or more.

Furthermore, as shown in Example 9 in Table 1, in the case where the above-described reactant (A) was TiCN-based cermet, it was confirmed that TiCN-based cermet could be sufficiently reacted when the mass ratio (B/A) was 4.

Furthermore, as shown in Example 10 in Table 1, in the case where the above-described reactant (A) was W—Ni-based alloy, it was confirmed that W—Ni-based alloy could be sufficiently reacted when the mass ratio (B/A) was 1.2 or more.

Furthermore, as shown in Examples 11, 12, 21 and 22 in Table 1, in the case where the tungsten containing material cermet) was supplied to NaNO$_3$, it was confirmed that the tungsten containing material could be sufficiently reacted when the total amount of the supplied tungsten containing material was 4 times of the total mass of NaNO$_3$ (when the reciprocal number of the mass ratio (B/A) in Table 1 was 4), and also confirmed that overflow of the reaction product did not occur when the supply time period of the tungsten containing material was 1 hour or more.

Furthermore, in Examples 1 to 10 and 14 to 20, when the tungsten containing material was heated to a temperature of 700° C. or more, it was confirmed that the reaction product was converted into a melt which was readily flown and fallen down from the surface of the tungsten containing material, to thereby facilitate the development of the reaction to increase the reaction rate.

In view of the above-described results, it was confirmed that each type of tungsten containing materials, NaNO$_3$ or NaNO$_2$ was gradually supplied for 1 hour or more, to cause a reaction between each type of tungsten containing materials and the molten salt of NaNO$_3$ or NaNO$_2$ at a reaction temperature of 700° C. or more to thereby produce the melt of the reaction product containing Na$_2$WO$_4$, with the result that the tungsten containing material could be efficiently reacted while controlling the reaction to suppress overflow from the reaction container.

Furthermore, it was also confirmed that the reaction product containing sodium tungstate could be continuously and efficiently produced by repeatedly performing the operations in Examples 1 to 13 shown in Table 1.

Example 23

A coated chip covered with a thin film such as TiC, TiN, TiCN, or $Al_2O_3$ was introduced into a drum which was then rotated. Thus, a part of the thin film was removed by the effects caused by the coated chips rubbed against each other. Then, when the coated chip from which a part of the thin film was removed was reacted as the above-described reactant (A) on the conditions of Example 7 in Table 1, it was confirmed that a high reaction rate of 99% was achieved.

It is to be noted that removal of the thin film of the coated chip is not limited to the method implemented by the coated chips rubbed against each other, but may be performed by some other chemical means and/or physical means.

Example 24

On the conditions in Example 1, the reaction rate was examined in each of the cases where (i) WC-based cemented carbide was not immersed in the melt of the reaction product, (ii) 50% of WC-based cemented carbide was immersed in the melt of the reaction product, (iii) 90% of WC-based cemented carbide was immersed in the melt of the reaction product, and (iv) WC-based cemented carbide was completely immersed in the melt of the reaction product (depth of about 50 mm). The reaction rate was calculated by the above-described expression (13).

As a result, the reaction rate was 72% in the case of (i), 88% in the case of (ii), 98% in the case of (iii), and 83% in the case of (iv).

It is to be noted that unreacted $NaNO_3$ remained in the reaction product in the case of (i). Furthermore, in the case of (iv), the proportion of $NaNO_3$ to be volatilized before reaction with the WC-based cemented carbide scraps was increased. Accordingly, the reaction rate was decreased.

Example 25

By dilution, with air, of the exhaust gas containing NO gas generated by the reaction between WC—TiC-based cemented carbide and the molten salt of $NaNO_3$, the NO concentration was set at 3200 ppm. Then, in accordance with the reaction represented by the above-described expression (3), the above-described exhaust gas was decomposed into nitrogen and water in the presence of an oxide catalyst of titanium at a temperature of 200° C. while changing the mixing ratio of ammonia gas.

Consequently, when mixing ammonia gas of 1.02 equivalent with respect to NO gas, the NO concentration in the exhaust gas could be decreased to 0.5 ppm though some unreacted ammonia gas was still detected.

Furthermore, when mixing ammonia gas of 0.99 equivalent with respect to NO gas, the NO concentration in the exhaust gas could be decreased to 40 ppm while unreacted ammonia gas was not detected.

Furthermore, when mixing ammonia gas of 0.96 equivalent with respect to NO gas, the NO concentration in the exhaust gas could be decreased to 150 ppm while unreacted ammonia gas was not detected.

Furthermore, when mixing ammonia gas of 0.93 equivalent with respect to NO gas, the NO concentration in the exhaust gas could be decreased to 210 ppm while unreacted ammonia gas was not detected.

It was confirmed that the NO gas in the exhaust gas without containing ammonia gas could be set at a low concentration of 150 ppm or less since the equivalent amount of ammonia gas was approximately 0.96 to 1.00 that could be controlled for the reaction of the NO gas amount with stability.

Furthermore, it was found from X-ray diffraction that the reaction product produced by the reaction between the molten salt of $NaNO_3$ and Co, Ni, TiC, and TaC which are components other than WC contained in the above-described WC—TiC-based cemented carbide is an oxoacid sodium salt such as $NaCo_2O_4$, $NaNiO_2$, $Na_8Ti_5O_{14}$, and $NaTaO_3$.

Then, water was caused to act on each oxoacid sodium salt described above, which was subsequently neutralized with an acid to achieve a pH of 7 or lower, for undergoing hydrolysis. Consequently, it was found from X-ray diffraction that the above-described oxoacid sodium salts were changed to water-insoluble $CO_3O_4$, NiO, $TiO_2$, $Na_3TaO_4$, and $Ta_2O_5$, respectively.

Example 26

The reaction product was obtained by causing a reaction between the molten salt of $NaNO_3$ and WC—TiC-based cemented carbide obtained by peeling off the thin film of the coated chip coated with a thin film such as TiC, TiN, TiCN, or $Al_2O_3$.

Then, the reaction product obtained as described above was dissolved in 200 ml of water to produce a precipitate which was then removed by filtration. Then, hydrochloric acid was added to the filtrate obtained by filtration, which was then neutralized to pH 7.

The component of the above-described filtrate neutralized by adding hydrochloric acid was examined by ICP atomic emission spectroscopy, and the component of the precipitate produced by adding hydrochloric acid to the filtrate was also examined by an X-ray microanalyzer.

As a result, 6.24 atomic percent of W, 0.0002 atomic percent of Co, not more than 0.0001 atomic percent of Ti (the quantitative lower limit of ICP atomic emission spectroscopy), 0.0008 atomic percent of Ta, 0.0005 atomic percent of Nb, and not more than 0.0001 atomic percent of Fe were detected from the filtrate neutralized by adding hydrochloric acid.

Furthermore, Co, Ti, Ta, and O were detected from the precipitate. It was confirmed that the component of the precipitate was an oxide of Co, an oxide of Ti, or an oxide of Ta which was insoluble in water.

The results of Examples as described above show that the present invention allows tungsten to be separated and collected as sodium tungstate from the tungsten containing material.

Example 27

An apparatus having a series of structures shown in FIG. 1 was manufactured, in which reaction container 17 was made of stainless steel and had a capacity of 410 liters. The WC—TiC-based cemented carbide obtained by peeling off a thin film from the chip coated with a thin film such as TiC, TiN, TiCN, or $Al_2O_3$ was supplied through supply port 1, and $NaNO_3$ was supplied through sodium nitrate supply port 2, to cause a reaction on the conditions equivalent to those of Example 1 in Table 1. Consequently, the supplied cemented carbide could be dissolved without causing overflow.

The reaction product that was placed in container 18 and cooled was examined by X-ray diffraction. As a result, only a single phase of $Na_2WO_4$ was recognized. It was also confirmed that the pH of the aqueous solution obtained by dissolving 3 g of product in 200 ml of water was 11.68 and the reaction occurred as in the expression (1). In X-ray diffraction, unreacted NaNO$_3$ was not detected in the reaction product. In addition, the compound of cobalt and titanium has relatively weak diffraction intensity as compared with that of Na$_2$WO$_4$, and no clear peak was recognized.

Furthermore, the gas produced by the reaction was removed through nitrogen oxide outlet port 16 and directed to the apparatus for rendering nitrogen oxide harmless (expression (3)). Consequently, the nitrogen oxide concentration in the processed exhaust gas showed a low value of 0 to 17 ppm. Thus, it could be confirmed that the nitrogen oxide could be rendered harmless.

Examples 28 to 35 and Comparative Example 1

First, the WC—Co-based cemented carbide having chromium and vanadium added thereto was reacted with the molten salt of NaNO$_3$, to produce a melt-like reaction product, which was then maintained at 720° C.

Then, the above-described reaction product was distributed to containers. With respect to the mass 1.00 of the above-described reaction product, tungsten (W) powder having a ratio of 0.29 in Example 28, tungsten carbide (WC) powder having a ratio of 0.29 in Example 29, carbide powder (main component: WC—Co) having a ratio of 0.29 in Example 30, carbide powder (main component: WC—Co) having a ratio of 0.44 in Example 31, carbon (C) powder having a ratio of 0.29 in Example 32, carbon (C) powder having a ratio of 0.05 in Example 33, tungsten (W) powder having a ratio of 0.45 in Example 34, and carbide powder (main component: WC—Co) having a ratio of 0.54 in Example 35 each as a reductant were introduced into separate containers, and held and reacted for 4 hours at the temperatures shown in Table 1, and then compared with Comparative Example 1 to which no reductant was added.

Then, the melt-like product having the above-described reductant introduced thereinto was cooled and solidified. Then, 3 grams of products were obtained from each container and dissolved in 200 ml of pure water, which was then filtered to produce an aqueous solution in each of Examples 28 to 35 and Comparative Example 1.

Then, the pH of the aqueous solution in each of Examples 28 to 35 and Comparative Example 1 was evaluated. In addition, the content of each of chromium (Cr) and vanadium (V) was also analyzed by ICP atomic emission spectroscopy. The results are shown in Table 2.

As shown in Table 2, it was confirmed that the content of Cr in the aqueous solution in each of Examples 28 to 35 into which W powder, WC powder, carbide powder, and C powder as reductants were introduced was remarkably low with respect to the amount of Cr dissolved in the reaction product in the aqueous solution (0.057 g per liter) of Comparative Example 1 into which the above-described reductant was not introduced. This shows that Cr was rendered insoluble in water by introduction of the above-described reductant.

The results shown in Table 2 indicated that the reducing power for Cr was shown in the order of carbide powder>W powder>WC powder>C powder. In addition, it was confirmed that little Cr remained in the aqueous solution when the reductant that was introduced in the above description was used.

As shown in Table 2, it was confirmed that the content of V in the aqueous solution in each of Examples 28 to 35 into which W powder, WC powder, carbide powder, and C powder as reductants were introduced was remarkably low with respect to the amount of V dissolved in the reaction product in the aqueous solution (0.0196 g per liter) of Comparative Example 1 into which the above-described reductant was not introduced. This shows that V was rendered insoluble in water by introduction of the above-described reductant.

The results shown in Table 2 indicated that the reducing power for V was shown in the order of carbide powder>W powder>WC powder>C powder. In addition, when the C powder among the reductants that were introduced in the above description was used as a reductant, the reduced amount of the content of V in the aqueous solution was decreased. Thus, it is considered that the reducing action of V is relatively small and a water-soluble vanadium compound still exists even when V is reduced.

The reaction between WC—Co-based cemented carbide and the molten salt of NaNO$_3$ proceeded in accordance with the above-described expression (1). In addition, the produced sodium oxide was reacted with water and converted into sodium hydroxide. Accordingly, as shown in Table 2, the aqueous solution in Comparative Example 1 into which no reductant was introduced was strongly alkaline.

On the other hand, as shown in Examples 28 to 35, the pH of the aqueous solution is generally lowered in accordance with an increase in the amount of the introduced reductant and was neutral in each of Examples 31, 34 and 35.

TABLE 2

| | Reductant | | Processing | Aqueous Solution | | |
| --- | --- | --- | --- | --- | --- | --- |
| | Type | Addition Ratio | Temperature (° C.) | pH | Cr Content (g/L) | V Content (g/L) |
| Example 28 | W Powder | 0.29 | 850 | 9.53 | 0.0003 | 0.0087 |
| Example 29 | WC Powder | 0.29 | 720 | 9.61 | 0.0005 | 0.0103 |
| Example 30 | Carbide Powder | 0.29 | 720 | 9.88 | 0.0002 | 0.0050 |
| Example 31 | Carbide Powder | 0.44 | 720 | 7.42 | 0.0001 | 0.0007 |
| Example 32 | C Powder | 0.29 | 720 | 11.37 | 0.0008 | 0.0187 |
| Example 33 | C Powder | 0.05 | 700 | 11.49 | 0.0191 | 0.0195 |
| Example 34 | W Powder | 0.45 | 800 | 7.31 | 0.0003 | 0.0008 |
| Example 35 | Carbide Powder | 0.54 | 720 | 7.24 | 0.0001 | 0.0006 |
| Comparative Example 1 | — | — | 700 | 11.60 | 0.0570 | 0.0196 |

Accordingly, it is considered that sodium oxide in the aqueous solution was almost completely converted into sodium tungstate.

In addition, it was confirmed that, when C powder was introduced as a reductant, sodium oxide hardly reacted and the pH was not so lowered, as shown in Examples 32 and 33.

Furthermore, the precipitate obtained by filtration during production of the aqueous solution in each of the above-described Examples 28 to 35 was dried and examined by an EDX analysis, with the result that Co was detected from all of the precipitates. This indicates that Co is rendered insoluble in water in the aqueous solution of each of Examples 28 to 35. In Example 35, unreacted W powder was found also in the precipitate since W powder as a reductant was excessively introduced.

Example 36

First, 1 kg of hard scraps of WC—Co-based cemented carbide (WC-based cemented carbide) was introduced into the reaction container made of stainless steel. The hard scraps contained in the reaction container was heated to 720° C. using a heating furnace, to which 1.2 kg of $NaNO_3$ powder was then supplied for 3 hours, to cause a reaction for producing a reaction product. In addition, the temperature of the heating furnace was adjusted to keep the temperature of the reaction product to fall within the range of 720° C. to 750° C. for keeping it as a melt until the reaction was completed.

Then, in the state where the temperature of the melt of the reaction product was kept at 720° C., soft scraps of WC—Co-based cemented carbide (WC-based cemented carbide) were supplied by each constant amount for 2 hours to the melt of the reaction product.

Consequently, it was confirmed that the amount of the soft scrap to be supplied is adjusted to cause the reaction between the above-described hard scraps and the molten salt of $NaNO_3$ to be gently developed, such that the reaction can be controlled. Furthermore, it was also confirmed that soft scraps are supplied to the melt of the above-described reaction product to cause a reaction of sodium oxide which is a by-product, with the result that sodium tungstate is obtained.

Figure 9:
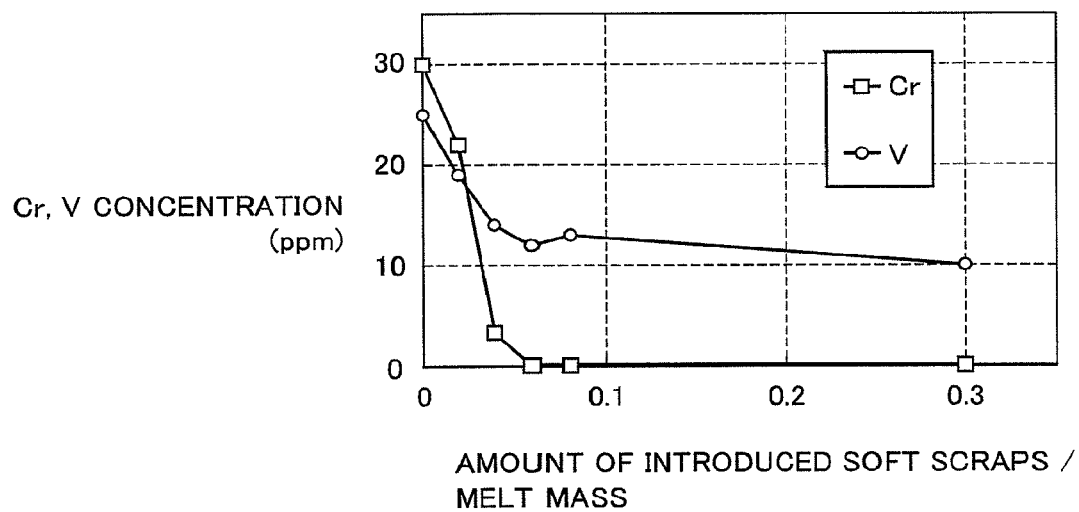
FIG. 9 is a diagram showing the relationship between the concentration of Cr and V in the aqueous solution and the ratio of the amount of the introduced soft scraps to the mass of the melt of the reaction product in Example 36.

The products produced during the reaction developed by supplying the soft scraps to the melt of the reaction products were sampled more than once in accordance with development of the reaction. The sampled products each were then dissolved in water to produce an aqueous solution. Then, the concentration of each of Cr and V dissolved in the aqueous solution was analyzed by ICP atomic emission spectroscopy. The results thereof are shown in FIG. 9. In FIG. 9, the vertical axis shows the concentration of each of Cr and V in the aqueous solution, and the horizontal axis shows the ratio of the amount of the introduced soft scraps with respect to the mass of the melt of the reaction product.

As shown in FIG. 9, approximately 100% of Cr could be rendered insoluble in water by reduction caused by introduction of soft scraps. Furthermore, while merely approximately 60% of V could be rendered insoluble in water by reduction caused by introduction of soft scraps, it could still be confirmed that V could be rendered insoluble in water by introduction of the reductant.

In addition, when the reaction product obtained by the reaction between the above-described hard scraps and the molten salt of $NaNO_3$ was dissolved, as is, in pure water to produce a $Na_2WO_4$ aqueous solution, sodium oxide which is a by-product of the above-described reaction is reacted with water to produce sodium hydroxide. Accordingly, the aqueous solution was strongly alkaline which was around pH 11.

On the other hand, the above-described soft scraps were introduced into the reaction product obtained by the reaction between the above-described hard scraps and the molten salt of $NaNO_3$, which was then dissolved in pure water to produce a $Na_2WO_4$ aqueous solution. In this case, sodium oxide which is a by-product of the above-described reaction was consumed by introduction of the above-described soft scraps. Consequently, the aqueous solution was slightly alkaline which was equal to or less than pH 8. Therefore, it is considered also preferable that, in the case where soft scraps are introduced, the amount of acid to be introduced can be reduced even when acid is introduced for neutralization in the subsequent process.

Example 37

After producing the melt of the reaction product by the reaction between the hard scraps of WC—Co-based cemented carbide (WC-based cemented carbide) and the molten salt of $NaNO_3$ in the reaction container, WC powder was introduced as soft scraps in the mass ratio of 0.30 with respect to a mass 1.00 of the melt of the reaction product.

Figure 10:
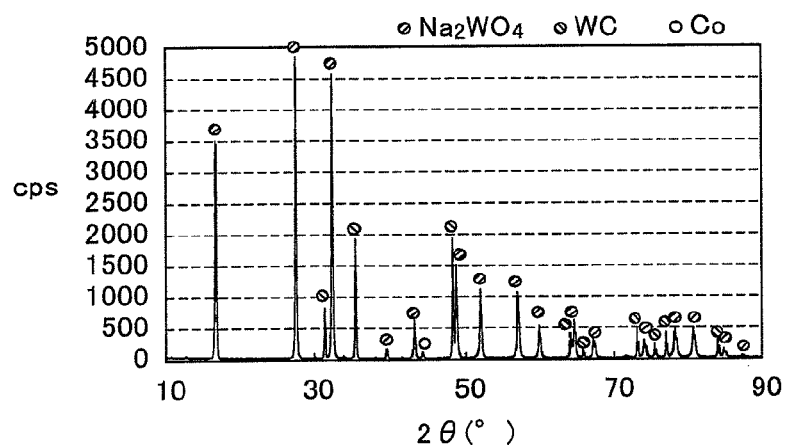
FIG. 10 is an X-ray diffraction pattern of a solid matter remained adhered to a reaction container in Example 37.

Then, after the above-described melt of the reaction product was cooled and solidified, it was dissolved in warm water of 80° C. to produce an aqueous solution. In this case, about 30% of the solidified reaction product was not dissolved in water but remained in the state of a rock-like solid matter and adhered to the reaction container. Then, the component of the solid matter remained adhered to the reaction container was analyzed by the X-ray diffraction method. FIG. 10 shows an X-ray diffraction pattern of the above-described solid matter obtained by the X-ray diffraction method. In FIG. 10, the vertical axis shows X-ray diffraction intensity (cps), and the horizontal axis shows a diffraction angle $2\theta$ (°).

In the X-ray diffraction pattern in FIG. 10, X-ray diffraction peaks corresponding to $Na_2WO_4$, WC and Co, respectively, were recognized. The X-ray diffraction peak corresponding to WC indicates that the WC powder introduced as described above was not completely reacted with sodium oxide and remained.

In addition, it is considered that oxygen is required to cause a reaction between the WC powder and sodium oxide, as represented in the above-described expression (10). Furthermore, another example of the method for causing the reaction between the WC powder and sodium oxide may include a method in which $WO_3$ powder of the oxide is introduced together with WC powder as a reductant in order to cause the reaction represented in the above-described expression (11). After producing the melt of the reaction product by the reaction between the hard scraps of WC—Co-based cemented carbide (WC-based cemented carbide) and the molten salt of $NaNO_3$ in the reaction container, the mixture of $WO_3$ powder and WC powder that is a main component of soft scraps was introduced in the mass ratio of 0.35 with respect to a mass 1 of the melt of the reaction product. It is to be noted that the molar ratio of the above-described mixture was $WC:WO_3=1:4$.

After the above-described melt of the reaction product was cooled and solidified, it was dissolved in warm water of 80° C. to produce an aqueous solution, with the result that the solidified reaction product could be completely dissolved in contrast to the case where WC powder alone was introduced.

Figure 11:
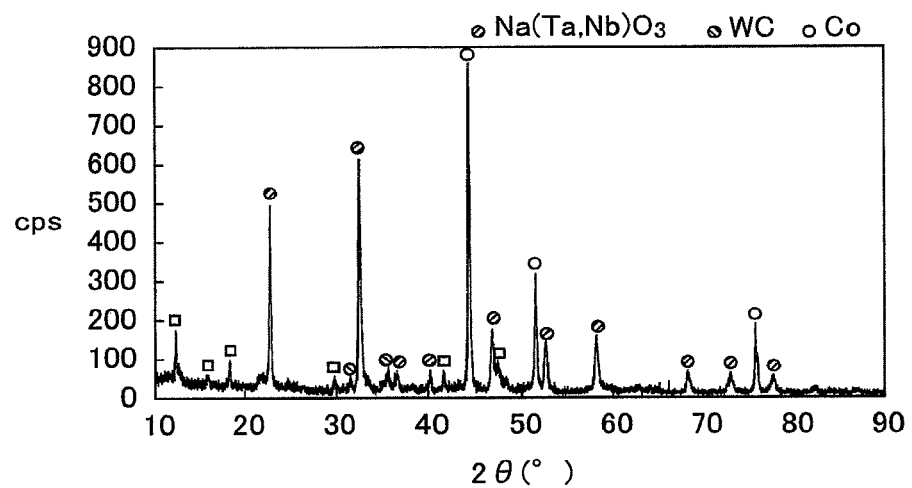
FIG. 11 is an X-ray diffraction pattern of residues obtained by filtering the aqueous solution from the melt obtained by introducing a mixture of WC powder and $WO_3$ powder in Example 37.

Then, the above-described aqueous solution was filtered to thereby obtain insoluble residue from the above-described aqueous solution. The component of the residue was then analyzed by the X-ray diffraction method. FIG. 11 shows an X-ray diffraction pattern of the above-described residue obtained by the X-ray diffraction method. In FIG. 11, the vertical axis shows X-ray diffraction intensity (cps), and the horizontal axis shows a diffraction angle 2θ (°).

While only a slight X-ray diffraction peak corresponding to WC was recognized in the X-ray diffraction pattern in FIG. 11, it was confirmed that most WC was consumed by the reaction with sodium oxide. Furthermore, any X-ray diffraction peak corresponding to $Na_2WO_4$ was not recognized in the X-ray diffraction pattern in FIG. 11. Accordingly, it was also confirmed that produced $Na_2WO_4$ did not remain in the aqueous solution but was entirely extracted by water.

Therefore, it was found that it is effective to supply oxygen in order to remove sodium oxide by adding WC powder and soft scraps to the reaction product produced by the reaction between the above-described hard scraps and the molten salt of $NaNO_3$.

In addition, an example of the method for supplying oxygen may include a method in which $WO_3$ is used together with WC as a reductant as described above.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention can be applied to a method for producing sodium tungstate, a method for collecting tungsten using the method and an apparatus for producing sodium tungstate.

The present invention can be applied to a method for producing a sodium tungstate aqueous solution and a method for collecting tungsten.

DESCRIPTION OF THE REFERENCE SIGNS

1 tungsten containing material supply port, 1a tungsten containing material introduction pipe, 1b, 2b storage unit, 2 sodium nitrate supply port, 2a sodium nitrate introduction pipe, 3 tungsten containing material, 4 sodium nitrate, 5 protection container, 6 heating device, 7 rotation shaft, 8 holding container, 9 melt, 10 outer wall portion, 11 discharge port, 12 roller, 13 protection container, 14 heating device, 15 inlet port, 16 outlet port, 17 reaction container, 18 container, 21 trough, 22 dust-collecting outlet port, 23 automatic supply device, 25 soft scrap, 27, 37 stirrer, 28 gas introduction port, 29 melt discharge passage, 31 powder supplier, 39 water, 41 holding furnace, 42 water dissolution bath.

The invention claimed is:

1. An apparatus for producing sodium tungstate, comprising:
    a holding container for holding a tungsten containing material;
    a supply port for supplying sodium nitrate or sodium nitrite;
    an inlet port through which outside air flows into;
    an outlet port through which gas generated by a reaction is discharged;
    a reaction container capable of holding a melt containing a reaction product produced by supplying sodium nitrate or sodium nitrite onto a surface of the tungsten containing material; and
    a discharge port through which said melt can be discharged to outside of said reaction container,
    said holding container being rotatably disposed within said reaction container,
    said supply port being disposed above said reaction container, and
    said discharge port being disposed below said reaction container.

* * * * *